United States Patent
Wanie

(10) Patent No.: US 10,497,248 B2
(45) Date of Patent: Dec. 3, 2019

(54) REMOTE WATER SOFTENER MONITORING SYSTEM

(71) Applicant: AJ1E Superior Solutions, LLC, Jackson, WI (US)

(72) Inventor: Andrew J. Wanie, Jackson, WI (US)

(73) Assignee: AJ1E Superior Solutions, LLC, Jackson, WI (US)

(*) Notice: Subject to any disclaimer, the term of this patent is extended or adjusted under 35 U.S.C. 154(b) by 0 days.

(21) Appl. No.: 15/783,585

(22) Filed: Oct. 13, 2017

(65) Prior Publication Data

US 2019/0114898 A1    Apr. 18, 2019

(51) Int. Cl.
| | |
|---|---|
| G08B 21/18 | (2006.01) |
| C02F 1/68 | (2006.01) |
| C02F 1/42 | (2006.01) |
| G08B 25/10 | (2006.01) |
| H04W 4/02 | (2018.01) |
| G01F 23/60 | (2006.01) |
| G01F 23/26 | (2006.01) |
| H04W 4/14 | (2009.01) |

(52) U.S. Cl.
CPC ............ *G08B 21/182* (2013.01); *C02F 1/42* (2013.01); *C02F 1/687* (2013.01); *G01F 23/263* (2013.01); *G01F 23/265* (2013.01); *G01F 23/603* (2013.01); *G08B 25/10* (2013.01); *H04W 4/02* (2013.01); *C02F 2209/008* (2013.01); *C02F 2209/42* (2013.01); *C02F 2307/12* (2013.01); *H04W 4/14* (2013.01)

(58) Field of Classification Search
CPC ......... G08B 21/182; G08B 25/10; C02F 1/42; C02F 2307/12; H04W 4/02; H04W 4/14; G01F 23/0007
USPC ...................................................... 340/539.1
See application file for complete search history.

(56) References Cited

U.S. PATENT DOCUMENTS

| | | |
|---|---|---|
| RE42,386 E | 5/2011 | Wanie |
| 2002/0174001 A1* | 11/2002 | Henry .................. G06Q 10/087 705/28 |
| 2004/0137959 A1* | 7/2004 | Salzhauer ................ G08B 1/08 455/567 |
| 2006/0114593 A1 | 6/2006 | Sagaert |
| 2008/0047881 A1 | 2/2008 | Buck et al. |

(Continued)

OTHER PUBLICATIONS

Extended European Search Report dated Dec. 11, 2018; 7 pages.

*Primary Examiner* — Jack K Wang
(74) *Attorney, Agent, or Firm* — Boyle Fredrickson S.C.

(57) ABSTRACT

A device for monitoring the level or amount of a material within a container is provided. The device includes a detection mechanism that can be a direct detection mechanism or an indirect detection mechanism. When the detection mechanism senses an upper level of the substance in the container that is below a predetermined lower limit for the substance, the mechanism operates an alarm mechanism to emit an alarm to alert an individual to the low level of the substance within the container. The alarm can wirelessly communicate a salt level state to a wireless network or a device on a wireless network that can transmit the status through the Internet to any remote location. In one aspect, the alarm can be sent on a mesh network with a device that can transmit the status and other conditions through the Internet and to an application executing on a mobile device.

20 Claims, 35 Drawing Sheets

(56) References Cited

U.S. PATENT DOCUMENTS

2014/0138321 A1* 5/2014 Koch .................. C02F 1/42
                                                    210/687
2016/0292990 A1* 10/2016 Pesz .................. G01F 23/0007

* cited by examiner

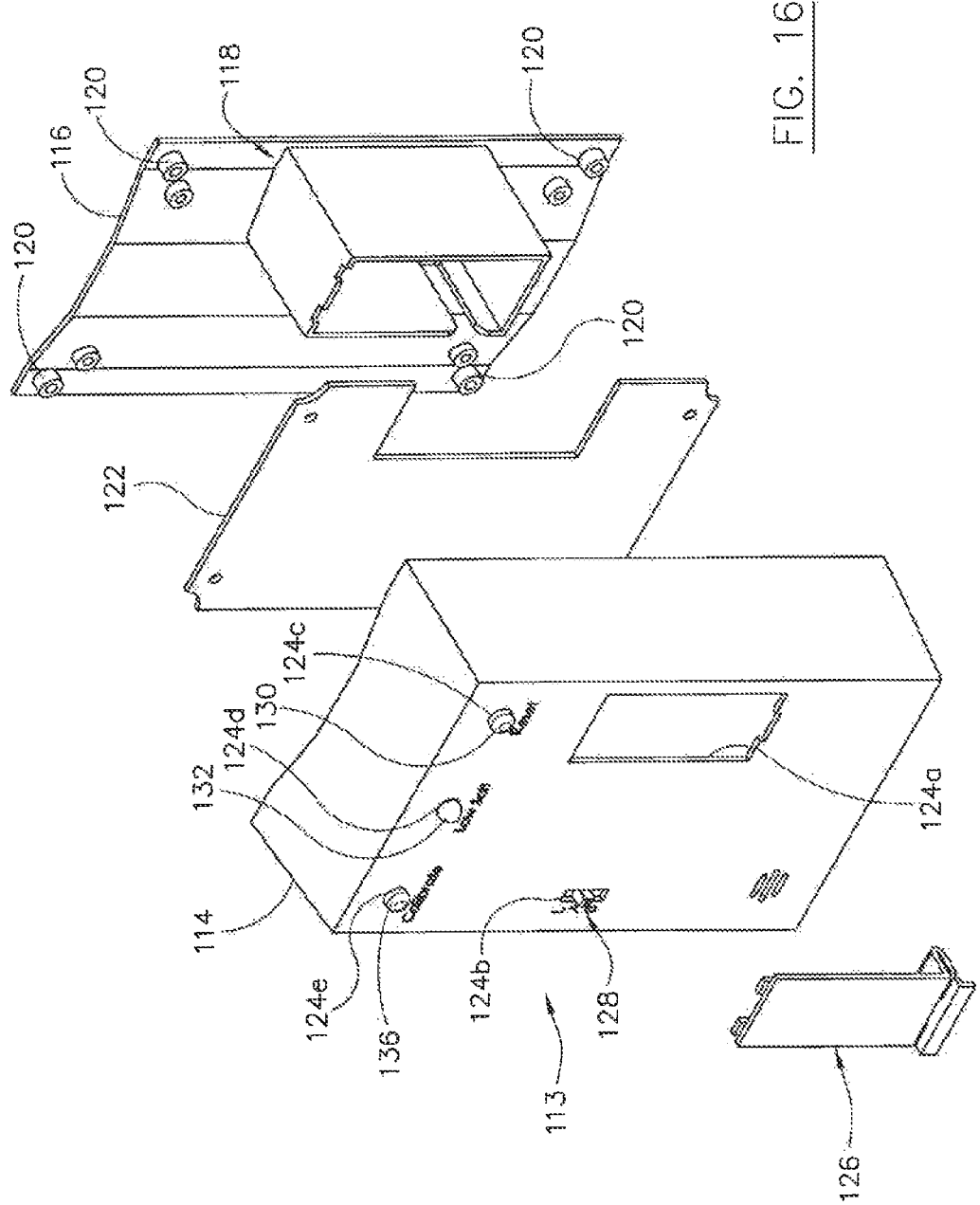

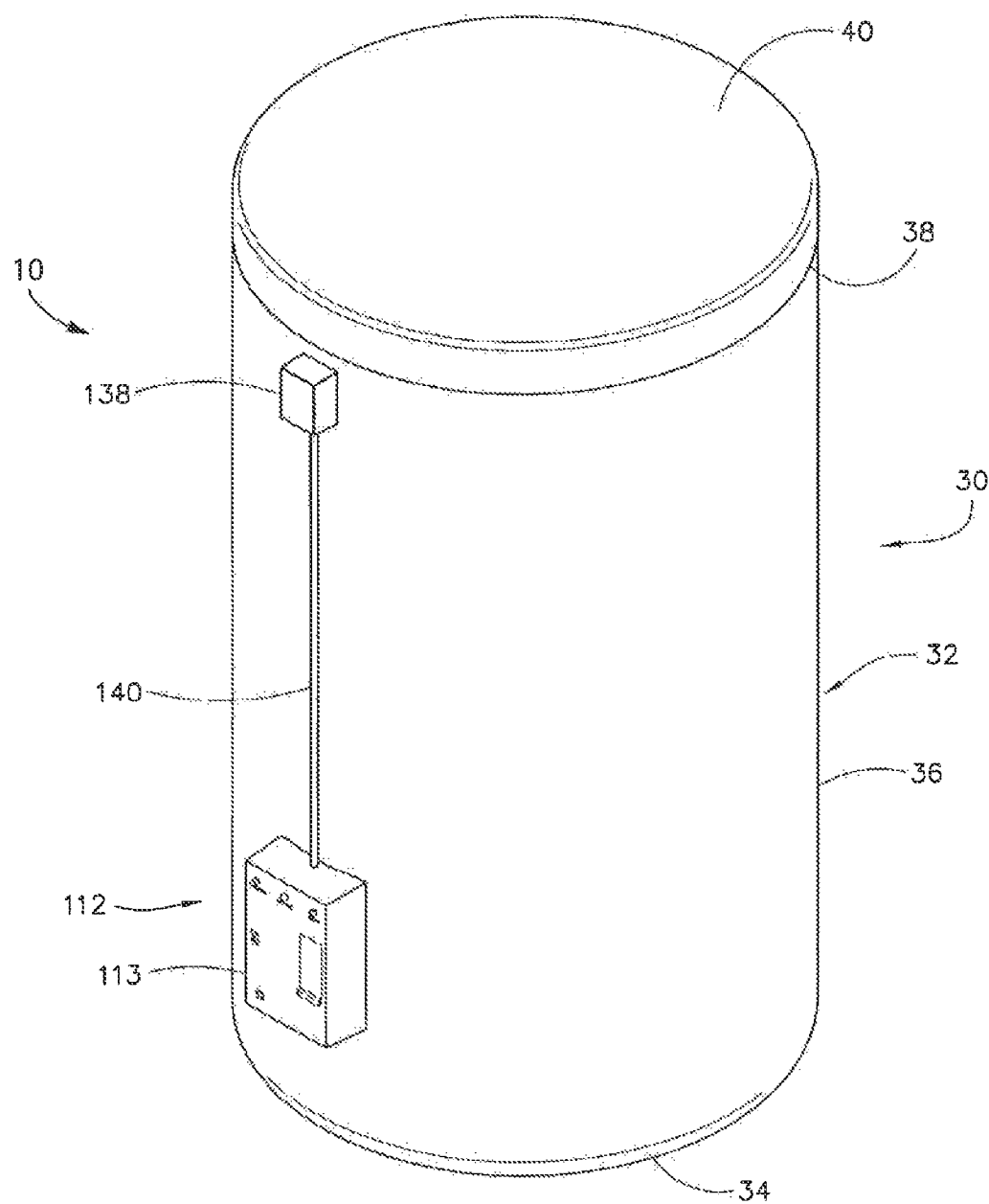

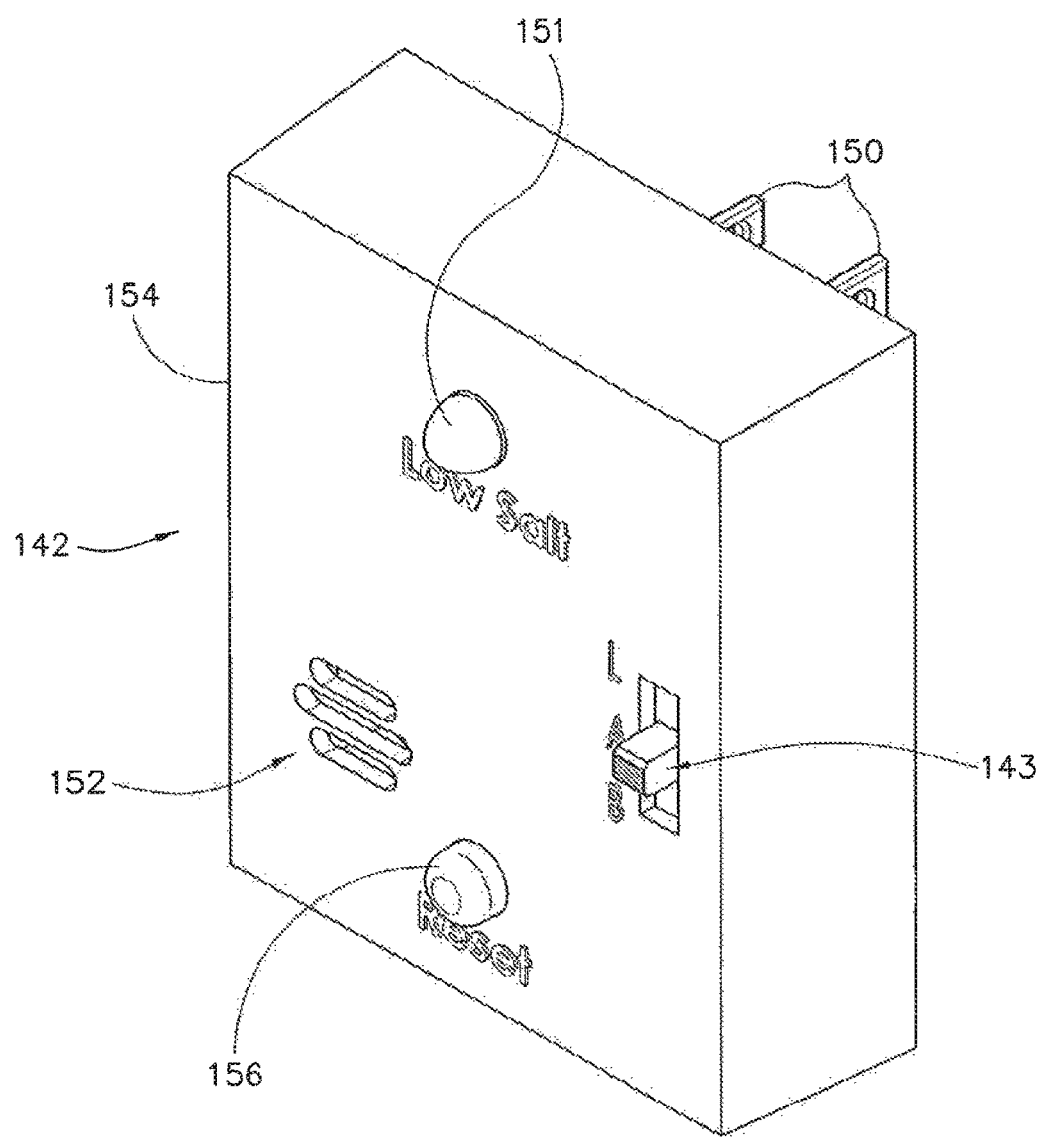

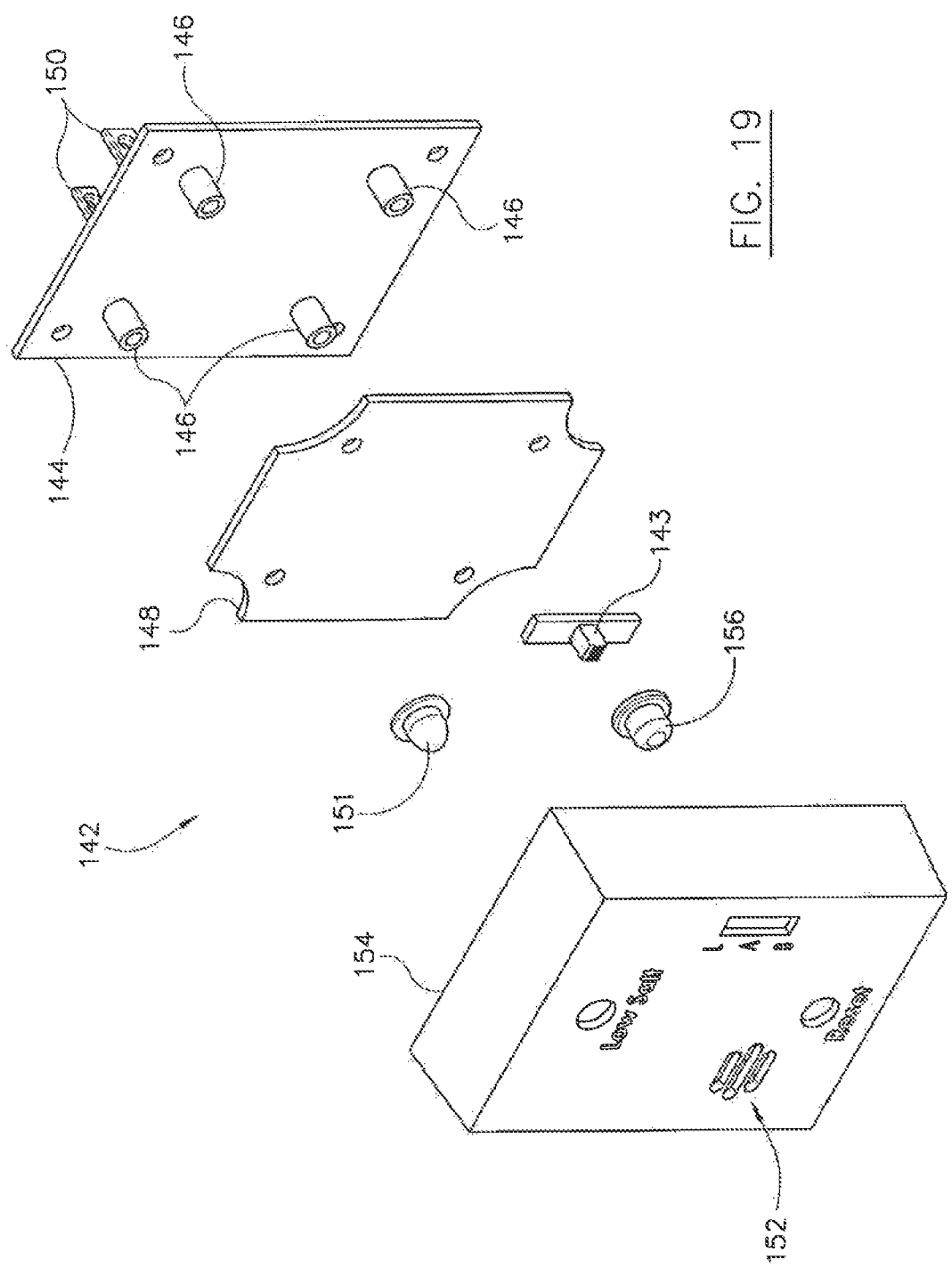

ness of the water softener. However, due to the normal placement of water softeners within a home, i.e., often in a basement in the well pump room, and the opaque materials utilized to form the tanks in which the salt is contained, many times the salt in the water softener salt tank is unknowingly completely exhausted, such that it can no longer form a brine solution and that water used thereafter by an individual is "hard".
REMOTE WATER SOFTENER MONITORING SYSTEM

FIELD OF THE INVENTION

The present invention relates generally to water softener salt tanks and, more specifically, to a system which remotely monitors the level of salt contained within the tank and activates an alarm when the level of salt falls below a predetermined threshold.

BACKGROUND OF THE INVENTION

Water softeners are used to soften hard water prior to the water being utilized by an individual. The water softener includes a salt tank through which water and salt form a brine solution which is used to flush the resin bed of the water softener, removing contaminants from the bed.

During operation of the water softener, the salt contained in the water softener salt tank is used up over time, such that the salt needs to be replenished in order to maintain the effectiveness of the water softener. However, due to the normal placement of water softeners within a home, i.e., often in a basement in the well pump room, and the opaque materials utilized to form the tanks in which the salt is contained, many times the salt in the water softener salt tank is unknowingly completely exhausted, such that it can no longer form a brine solution and that water used thereafter by an individual is "hard".

Running out a brine tank of salt causes hard water to pass through the hot water heater causing buildup of sediment in the tank, along with causing unwanted characteristics in the water such as hardness on the skin and poor lathering and cleaning of soaps and detergents. Most users of water softeners have let their brine tanks run out of salt due to the poor visual signs of low salt in the tank and due to the fact that the tanks are usually placed in a location that is infrequently seen or visited such as the basement or closet. There are also instances where the ability to communicate the status of the salt in the tank and or other conditions in the tank to someone at a remote location is impaired, particularly due to the nature of the infrequently seen or visited locations that may be selected.

To remedy this problem, a number of different monitoring devices for water softener salt tanks have been developed. The majority of these mechanisms involve a number of interacting parts which, when the salt reaches a predetermined lower limit in the tank, operate to provide some type of indication to a user that the salt in the water softener tank needs to be replenished.

While the majority of these devices are generally effective in providing an indication to an individual when salt in a water softener tank needs to be replenished, the costs for assembly and/or maintenance of these prior art monitoring devices are often high due to the large number of interacting or interconnected components of the devices which do not hold up well under the harsh conditions formed by the salt water present in the water softener tank. The devices are also cumbersome to install for the average user. These devices also are not capable of communicating remotely at longer distances to individuals who may be responsible for maintaining the equipment for filling the tanks with salt.

Therefore, it is desirable to develop a monitoring system for a water softener salt tank that is not constructed from a large number of parts, is capable of accurately determining the amount of salt remaining in the water softener salt tank, and is more easily installed outside the harsh environment of the tank. It is also desirable to develop a monitoring system which can be adapted for use with a variety of water softener tanks without requiring significant modifications. It is also desirable to develop a system that can communicate with individuals outside the normal ranges of most transmitters.

SUMMARY OF THE INVENTION

While there have been many means developed to sense substances inside containers, this invention relates to sensing salt, water, brine, and the combinations of each along with the unique problems involved in sensing these substances inside the environment of the brine tank of a water softener including as described in U.S. Pat. No. RE42,386, which is incorporated herein by reference. This invention also includes a device that is preferably on the outside of the brine tank without making any major modifications to the container and with a means for sensing into the container preferably through the wall. This invention further includes an alert signaler located in a frequented area of the house so it will be noticed when it alarms. This invention also includes software and hardware to wirelessly communicate a salt level state to a wireless network or a device on a wireless network that can transmit the status through the Internet to any remote location. This invention further includes software and hardware to communicate with other devices on a mesh network and with a device that can transmit the status and other conditions through the Internet and to an application executing on a mobile device, tablet, or computer using the application software or through standard email protocol.

According to one aspect of the present invention, a water softener salt tank monitoring system is provided in which the system includes a sensing unit capable of determining the level of salt remaining in the tank and sensing the presence of the solution inside the container or brine tank through the use of means for sensing that includes capacitive elements. This capacitive sensing unit is connected to a monitoring device that processes the data from the sensing unit. The sensing unit and monitoring device are contained within a housing preferably adapted to be positioned on the exterior of the water softener salt tank. The sensor also includes a detection mechanism capable of determining how much salt remains within the water softener salt tank. When the detection mechanism determines that the level of salt within the tank has fallen below a predetermined lower limit, the sensor activates an alarm mechanism that is operably connected to the detection mechanism. The system notifies a user of a low salt condition through an audible, visible, or combined signal to an individual indicating that the salt in the water softener salt tank needs to be replenished. The alarm mechanism can be formed as a single unit with the detection mechanism in the sensor, or can be formed as a separate unit that can be spaced from the sensor. When the alarm mechanism is formed separately and spaced from the sensor, the alarm mechanism can be activated by a signal sent to the alarm mechanism from the sensor.

According to another aspect of the invention, the sensing unit can communicate status and conditions wirelessly to other devices on a network, or to other devices on a mesh network. Those devices can communicate to other remote devices through an Internet connection using computer or mobile device applications and/or standard email protocols.

According to another aspect of the present invention, the detection mechanism can be a direct detection mechanism that can be arranged in direct contact with the salt within the water softener salt tank. The direct detection mechanism rests on an upper surface of the salt and is continuously lowered with respect to the tank as the salt within the tank is dissolved during the water softening process. When the salt level and direct detection mechanism reach a predetermined lower limit, the direct detection mechanism engages the sensor in order to operate the alarm mechanism. The direct detection mechanism can be mounted on the brine tank or elsewhere in the home.

According to still another aspect of the present invention, the detection mechanism for the sensor can be an indirect detection mechanism employing a capacitance-based system, infra-red wave, or electromagnetic wave-based detection system located in the housing for the sensor. With either system, the sensor housing is preferably positioned on the exterior of the water softener tank adjacent a lower limit for the level of the salt within the tank. The indirect detection mechanism then monitors the level of the salt within the tank by obtaining either capacitance or electromagnetic wave data on the salt in the tank and using this data to determine whether the amount of salt in the tank has reached the lower limit. At that point, the indirect detection mechanism actuates the alarm mechanism to inform an individual, audibly and/or visually, that the salt within the water softener salt tank needs to be replenished.

The sensor can also be modified to include a separate or second indirect detection mechanism which provides reference data or a reference value to the first indirect detection mechanism in order to accurately determine the level of the salt within the tank. The reference value provided by the second mechanism is used by the first mechanism to compare the reference value with an actual value obtained by the first mechanism. If the actual value is equal to or above the reference value, the sensor can activate the alarm mechanism to inform the individual that the salt level is at or below the lower limit in the tank.

The system for monitoring can alternatively use another type of indirect means for sensing such as an inductance-based, infrared wave-based, or electromagnetic wave-based system. The inductance-based system preferably utilizes an inductive coil to sense the presence of the solution inside the brine tank. The infrared wave-based system preferably emits an infra-red wave that is either reflected back by the solution or is sensed on the other side of the container by a receiver. The electromagnetic wave-based system emits low frequency radio waves that are reflected back to the sensing unit. The reflecting waves' intensity and return time are used to calculate a level of salt in the brine tank. Each of these sensing units is connected to a monitoring device that monitors the tank and actuates the alarm mechanism as needed.

According to another aspect of the present invention, the unit housing is attached to the outside of the brine tank through a variety of techniques. This includes the use of an adhesive, tabs having double sided tape, hook and loop fasteners, e.g., Velcro, tabs having a male and female connection and a rod fastened to the tank upon which the housing may be slid up and down.

According to another aspect of the present invention, a capacitance-based monitoring system includes a computer comprised of a processor and memory, for example, on a chip. Software runs on the processor tracks the variations in capacitance values and cycle times to aid in detecting the salt level. Other software permits various other aspects of the present invention. One such aspect includes the processor determining a proper threshold for setting an alarm point. Another aspect includes the processor operating without determining a threshold by analyzing high and low capacitance values. Still another aspect permits a user to vary the sensitivity setting of the detection mechanism. A further aspect measures capacitance high points, low points, and the time between them to enable the detection mechanism to go into a sleep mode, thereby increasing battery life. Yet another aspect tracks the time between high and low points to determine if the tank has a build-up of substance on the inside of the tank.

According to another aspect of the present invention, an induction-based detection mechanism is located in a housing that is mounted on a shaft fastened to the tank. The device housing slides up and down on the shaft until the inductance of the solution is sensed. The housing can then be fixed in place to monitor the substance in the tank.

According to another aspect of the present invention, an infrared-based monitoring system is used. An infrared wave is generated that may be reflected back by the substance in the tank. If the level of the substance is below the infrared wave, the infrared wave is sensed by a sensing unit on the opposite side of the tank.

According to one embodiment, the mobile communications device refreshes display of the icon according to calibration messages received from the wireless communications device.

Further, the present invention's salt level monitoring system may include a wireless base station connected to a network. The wireless base station is configured to detect the second signal and communicate a message indicating an alert to the network upon detecting the second signal. Preferably, the wireless base station communicates over the Internet. When the salt level is below a threshold, an alert is sent to a user informing the user of the condition via connectivity to at least one of a gateway, WIFI, and an SMS Text message.

In another embodiment, the salt level monitor has a hardware sensing system integrated to a valve head and includes a control board with circuitry to detect salt levels and components to interface to a local hub.

Additionally, the salt level monitor of the present invention may include a system incorporating a home automation solution and protocol having at least one of the following:

a) a Bluetooth or Bluetooth Mesh protocol for many-to-many over low energy close proximity Bluetooth radio to allow devices to re-transmit messages from nearby peers and extend the range of the overall device network;

b) a webmesh wireless network allowing each node to repeat data transfer to extend range;

c) a Z-Wave wireless smart home control technology which operates at about 908 MHz:

d) a universal power bus that uses building power wiring to transmit signals to control remote devices;

e) a Google thread that uses 6LoWPAN (IEEE802.15) wireless protocol with mesh communication;

f) an Insteon protocol that uses power wiring and radio frequency to control remote devices; and h) a Zigbee small low-power digital radio for close proximity low data rate communication.

The monitor may further include at least one of the following:

a) an LCD unit or other unit which acts as a signal strength meter and sends out packets of information from a transmitter to a remote receiver during a set period of time while in a calibration stage, wherein the unit is used by a user to move around at a distance away from the transmitter to find a location for the remote receiver that has good reception and if the user moves too far away, there will be times the receiver does not receive a packet and the icon will turn off;

b) receiver electronics in communication with a valve board of a softener that lets the softener valve board receive commands from a transmitter, decode them, and handle the 'low-salt' condition through a display, WIFI connection, or other alarm; and c) a remote alarm that can be placed about 100 feet away from the tank and is battery operated with about 5 years of life.

The monitoring devices, detection mechanisms, and sensing units of these and other embodiments are preferably housed in an airtight and watertight enclosure made of plastic material that is as close as possible in proximity to a container surface of regular or irregular shape. The enclosure is easily installed by a person of normal abilities in a cost-effective and efficient way. The enclosure has the ability to conform to the irregular shapes through inventive flexible mounting pads. The pads can be permanently attached to the enclosure or permanently attached to the surface with the ability to remove and replace the enclosure on the surface for maintenance issues.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 16 is an exploded, isometric view of the monitoring device of FIG. 15;

FIG. 17 is an isometric view of the system of the present invention having a third embodiment of the monitoring device;

FIG. 18 is an isometric view of an alarm mechanism utilized with the monitoring device of the present invention;

FIG. 19 is an exploded, isometric view of the alarm mechanism of FIG. 18;

Figure 1:
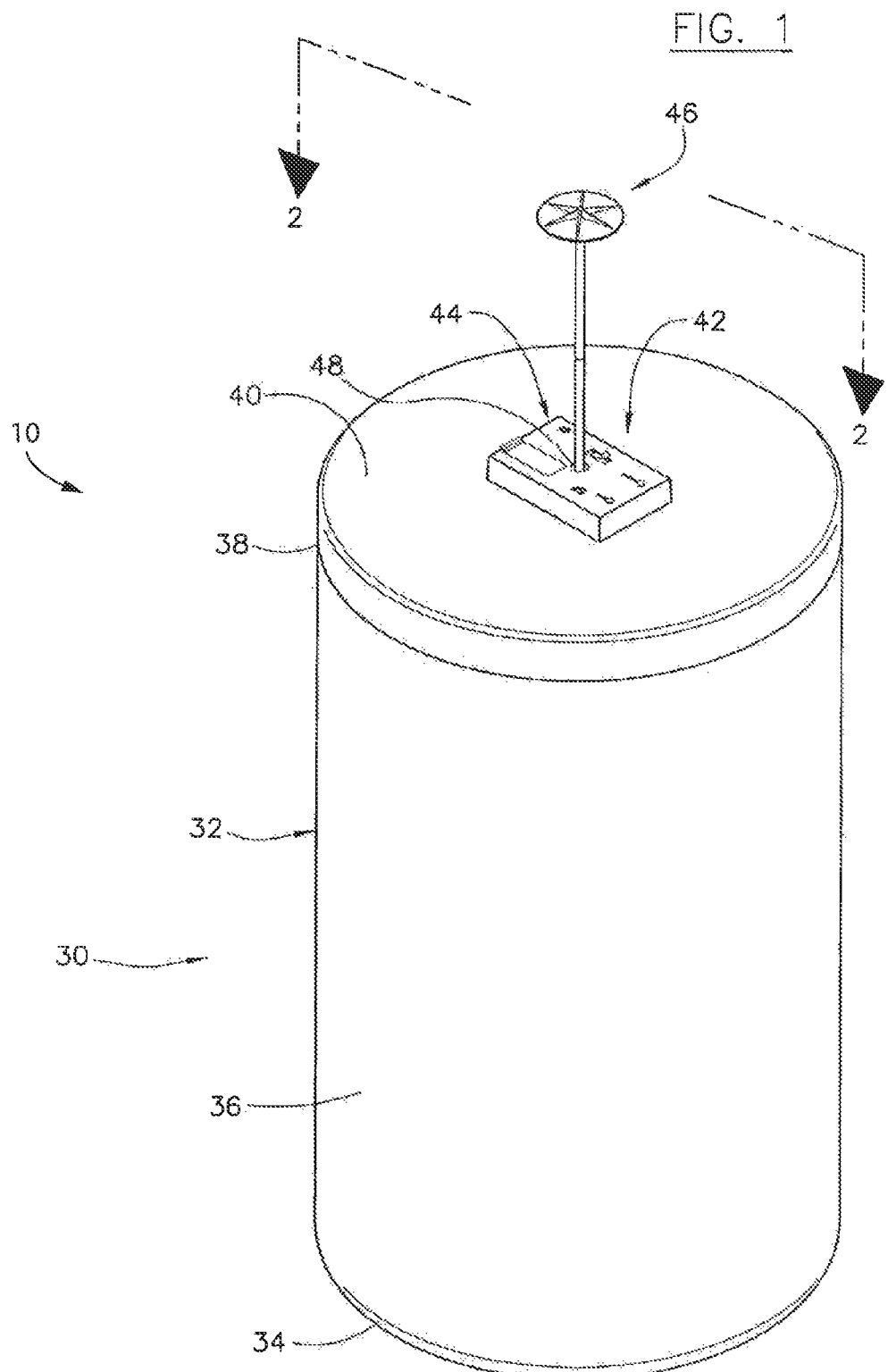
FIG. 1 is an isometric view of a system of the present invention having a water softener tank including a first embodiment of a monitoring device.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word "connected", "attached" or terms similar thereto are often used. They are not limited to direct connection or attachment but include connection or attachment through other elements where such is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

With reference now to the drawing figures, FIGS. 1-29 in which like reference numerals designate like parts throughout the disclosure, the present invention is a system 10 including a container, for example, a typical water softener salt tank 30.

In FIG. 1, the tank 30 is generally rectangular in shape and includes a preferably plastic body 32 having a closed lower end 34, a generally cylindrical sidewall 36 extending upwardly from the lower end 34 and an open upper end 38 opposite the lower end 34. The tank 30 also includes a cover 40 releasably engageable with the upper end 38 in order to enclose the body 32. Such a tank is readily available through several commercial vendors.

Referring now to FIGS. 1-4, tank 30 preferably also includes an inventive salt monitoring device 42 mounted to the cover 40. The device 42 includes a sensor 44 positioned on the cover 40 opposite the body 32 and a detection mechanism 46 connected to and extending through the sensor 44. The mechanism 46 is positioned partially within and partially outside of the tank 30 by extending the mechanism 46 through an opening 48 in the sensor 44 that is aligned with a similar opening 50 in the cover 40.

Looking now at FIGS. 2-8, the detection mechanism is preferably a direct detection mechanism 46 including a lower member 52 positioned within the tank 30, an upper member 54 positioned outside of the tank 30, and a central member 56 extending between the lower member 52 and upper member 54. Each of the components of the detection mechanism 46 is formed from a generally rigid, inert material, such as a hard plastic, and preferably ABS plastic, that is not detrimentally affected by prolonged exposure to salinic conditions and is relatively easy to form into the components of the mechanism 46. Further, while the lower member 52 and upper member 54 are generally circular in shape and extend radially outwardly from the point of connection of each of the lower member 52 and upper member 54 to the central member 56, the lower and upper members can have any desired shape. The lower disk member 52 rests on an upper surface 200 of an amount of salt 202 positioned within the body 32 of the tank 30. Further, the central member 56 is formed to have a diameter slightly less than the diameter of the opening 48 in the sensor 44 and opening 50 in the cover 40, such that the central member 56 can slide with respect to the sensor 44 and cover 40.

Figure 2:
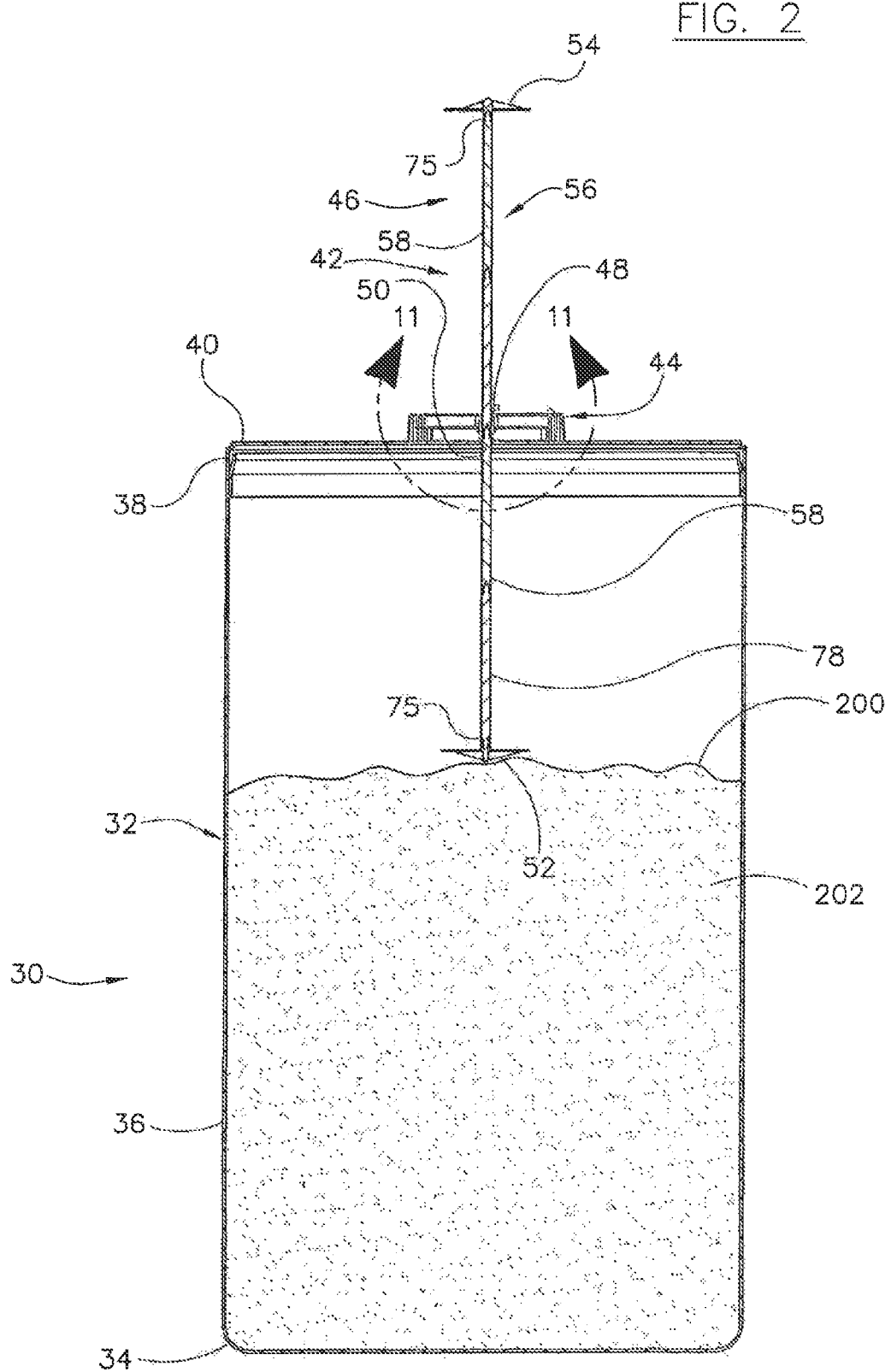
FIG. 2 is a cross-sectional view along line 2-2 of FIG. 1.
Figure 3:
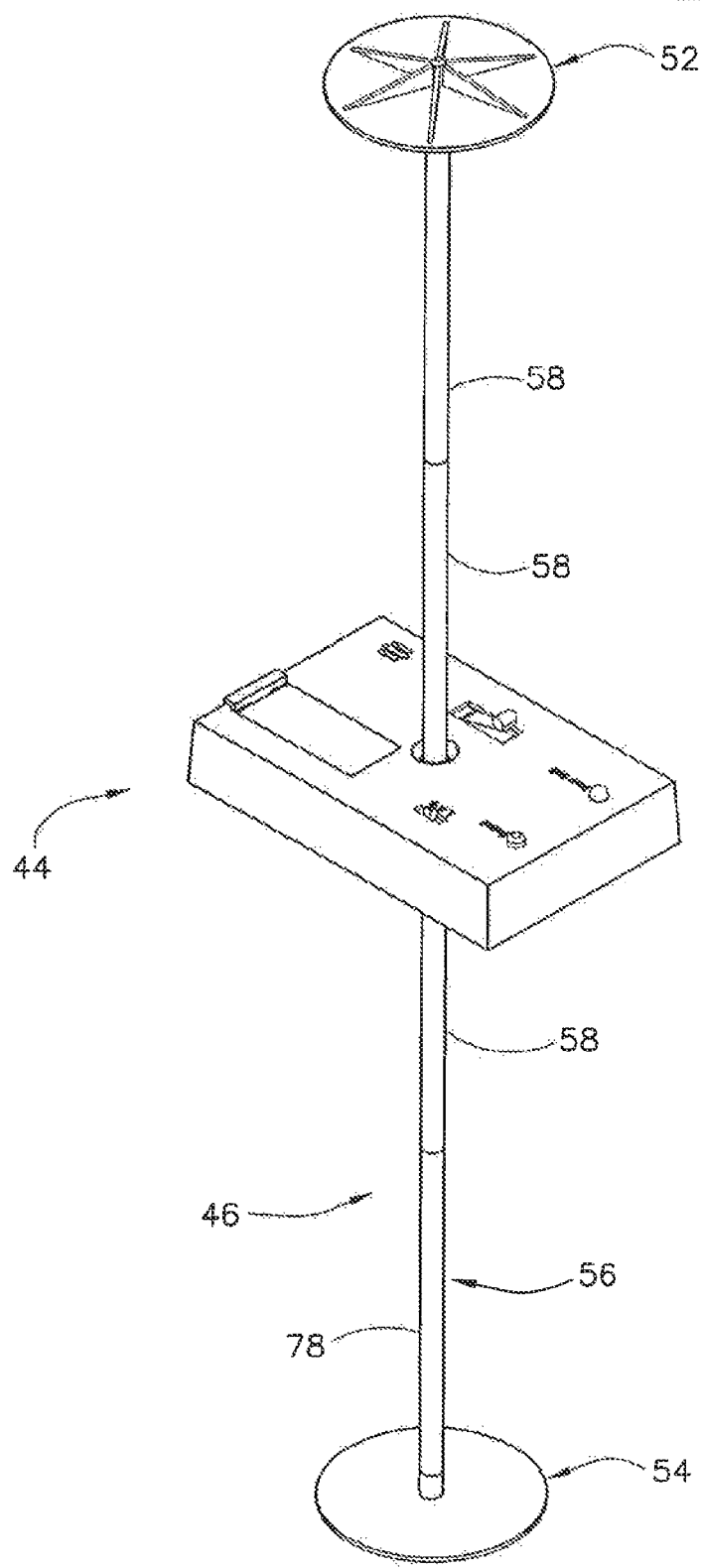
FIG. 3 is an isometric view of the monitoring device of FIG. 1.
Figure 4:
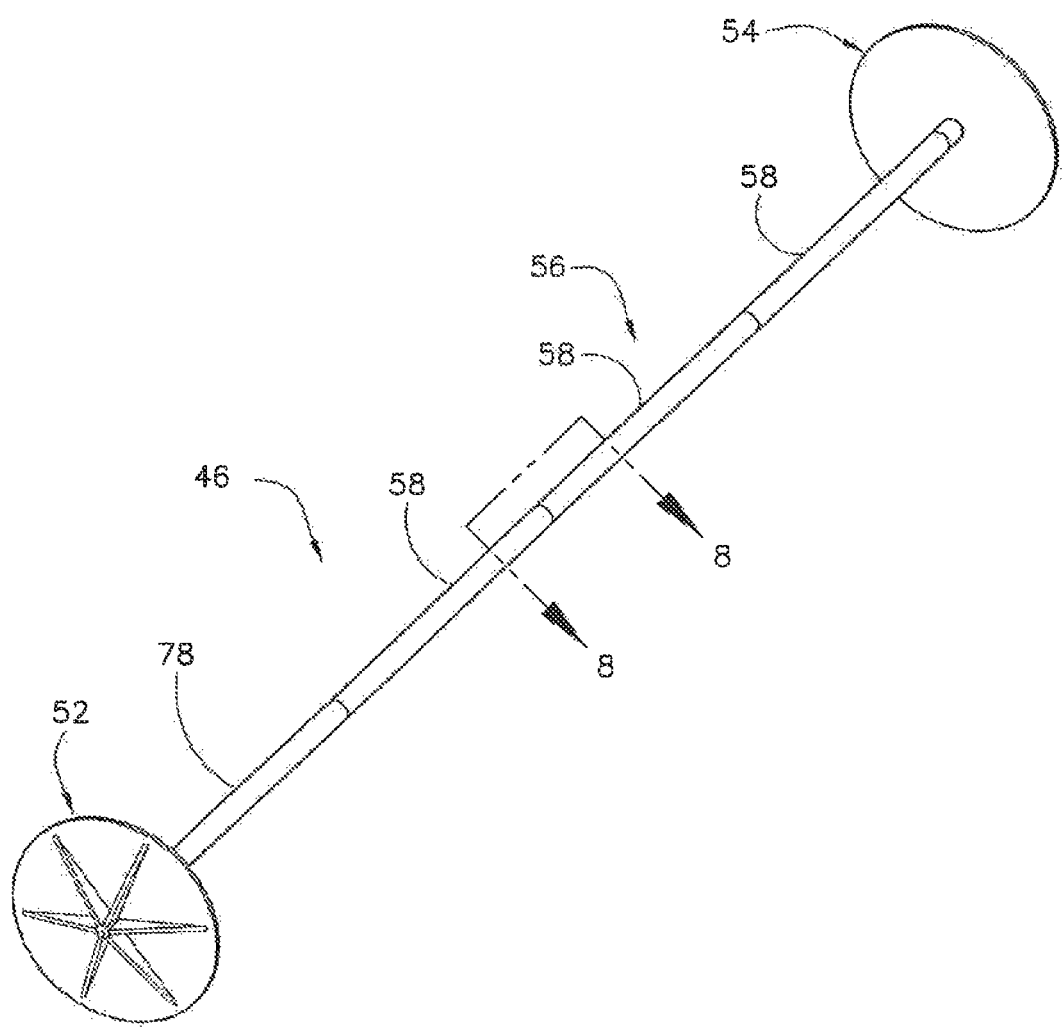
FIG. 4 is an isometric view of a direct detection mechanism of the device of FIG. 3.
Figure 5:
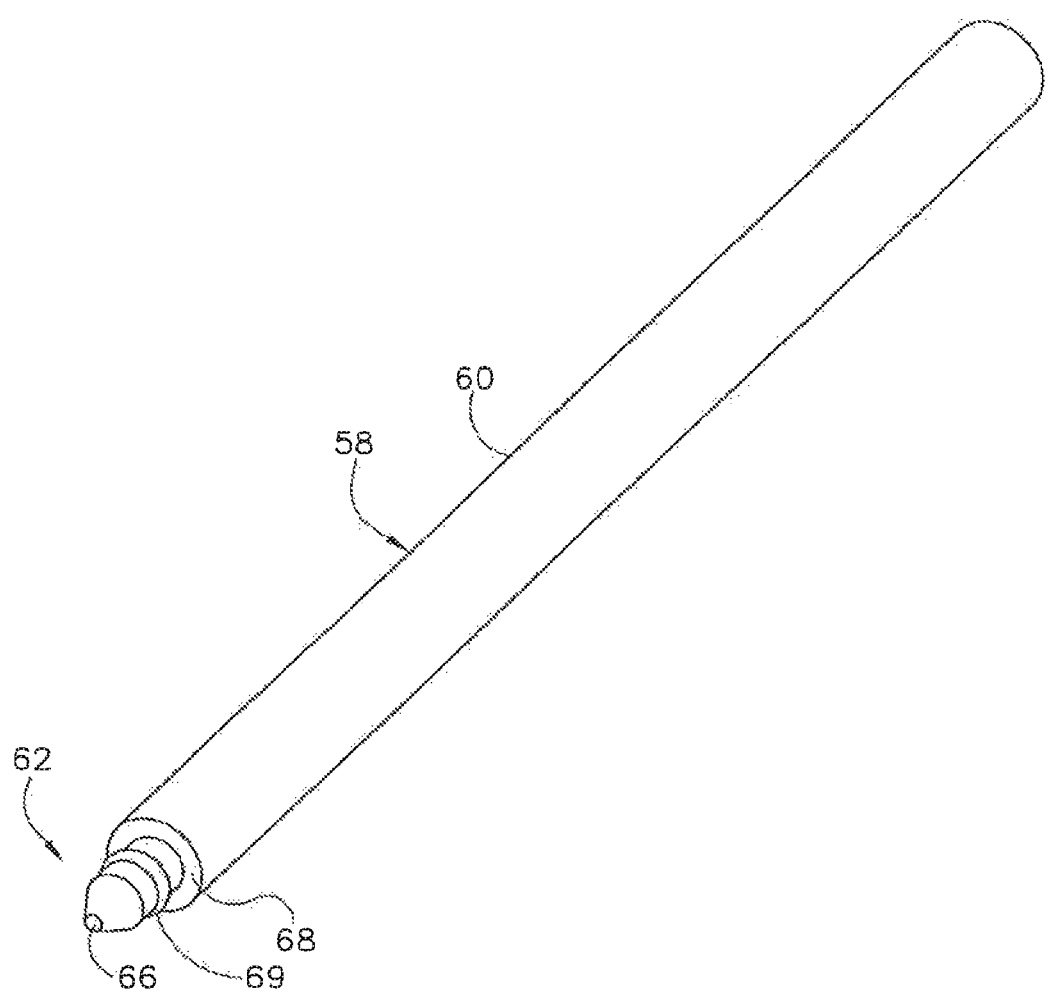
FIG. 5 is an isometric view of a first embodiment of a modular component of the direct detection mechanism of FIG. 4.
Figure 8:
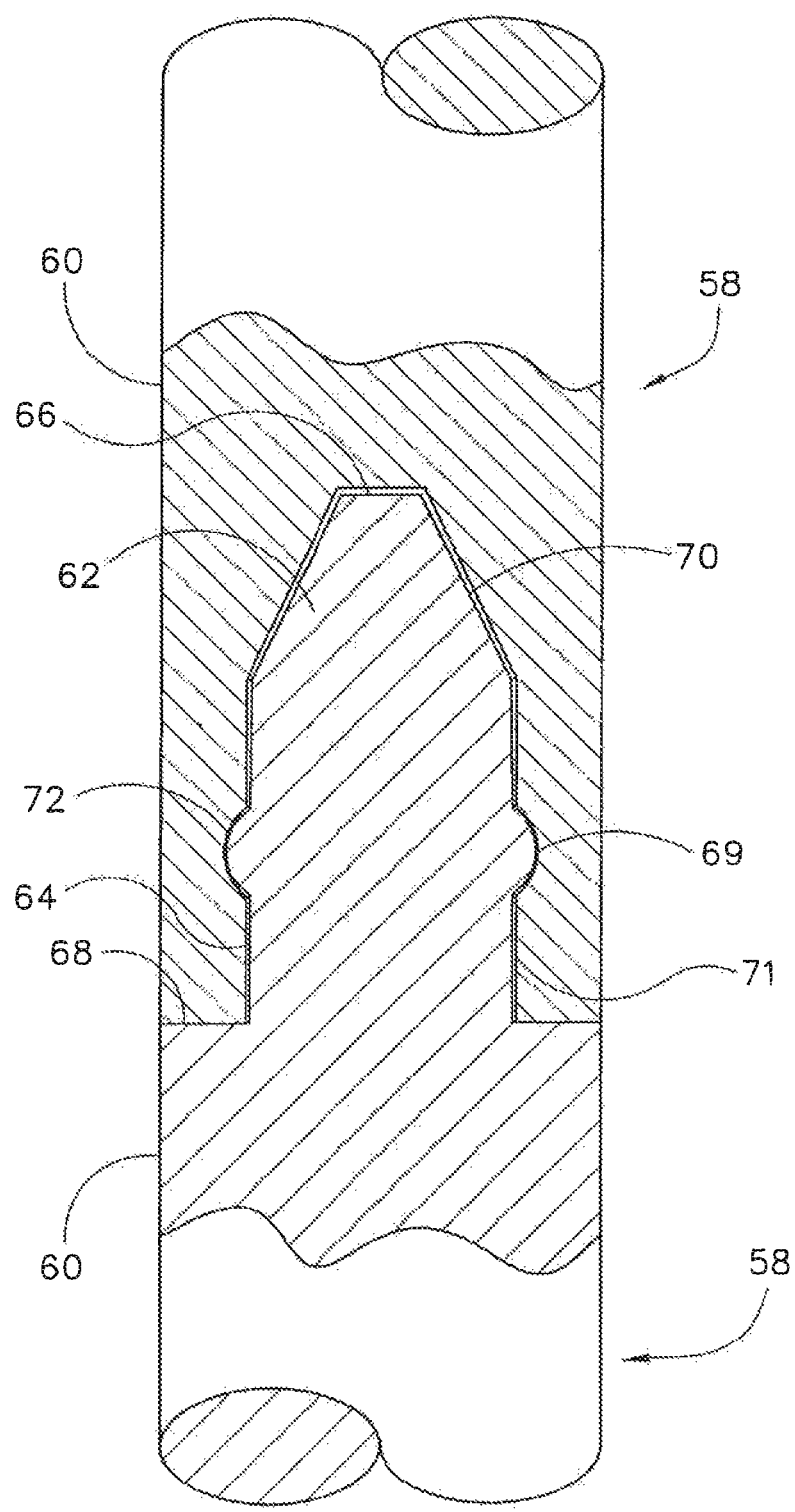
FIG. 8 is a cross-sectional view along line 8-8 of FIG. 4.
Figure 9:
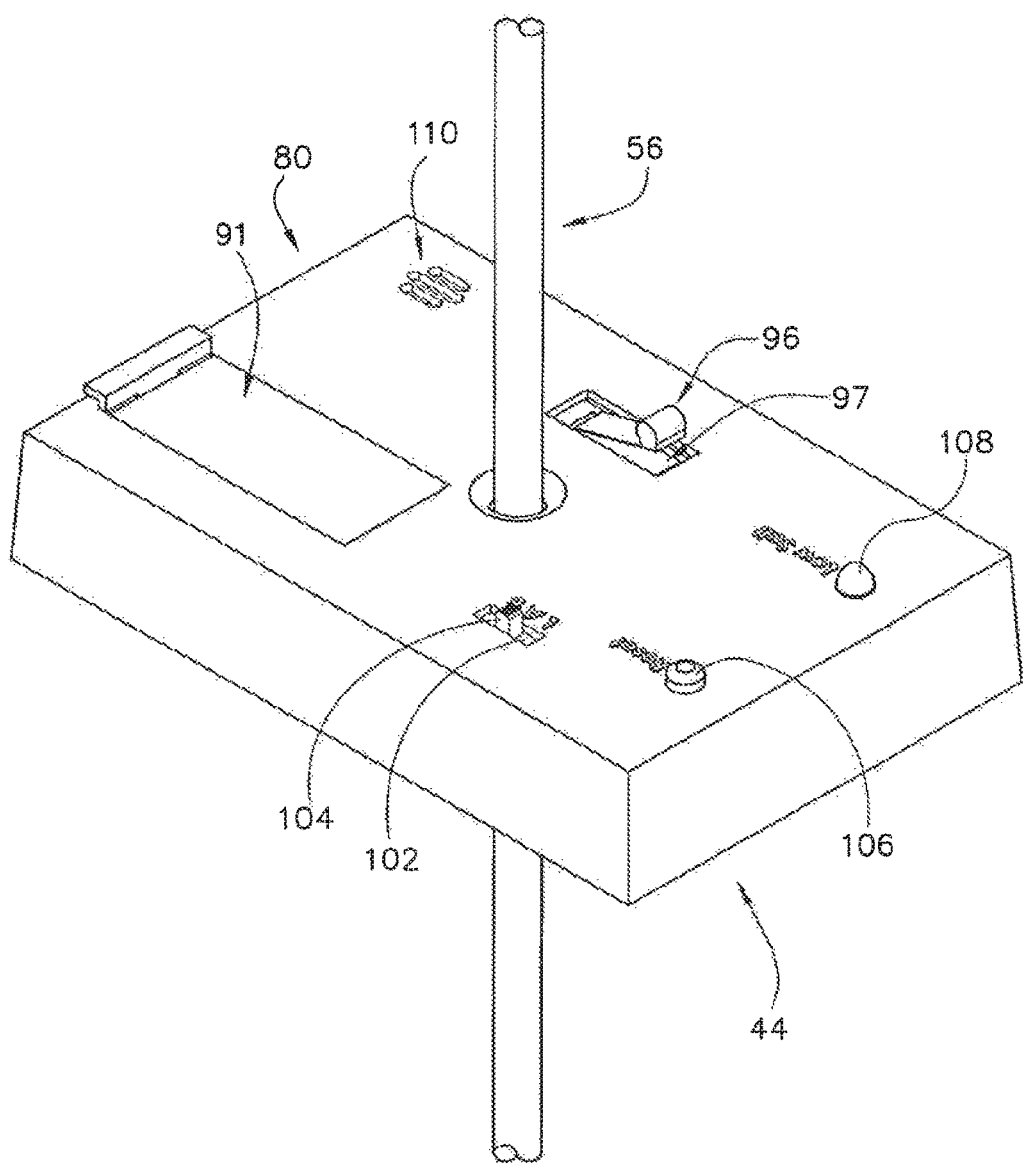
FIG. 9 is a partially broken away, isometric view of the sensor and direct detection mechanism of the monitoring device of FIG. 3.
Figure 10:
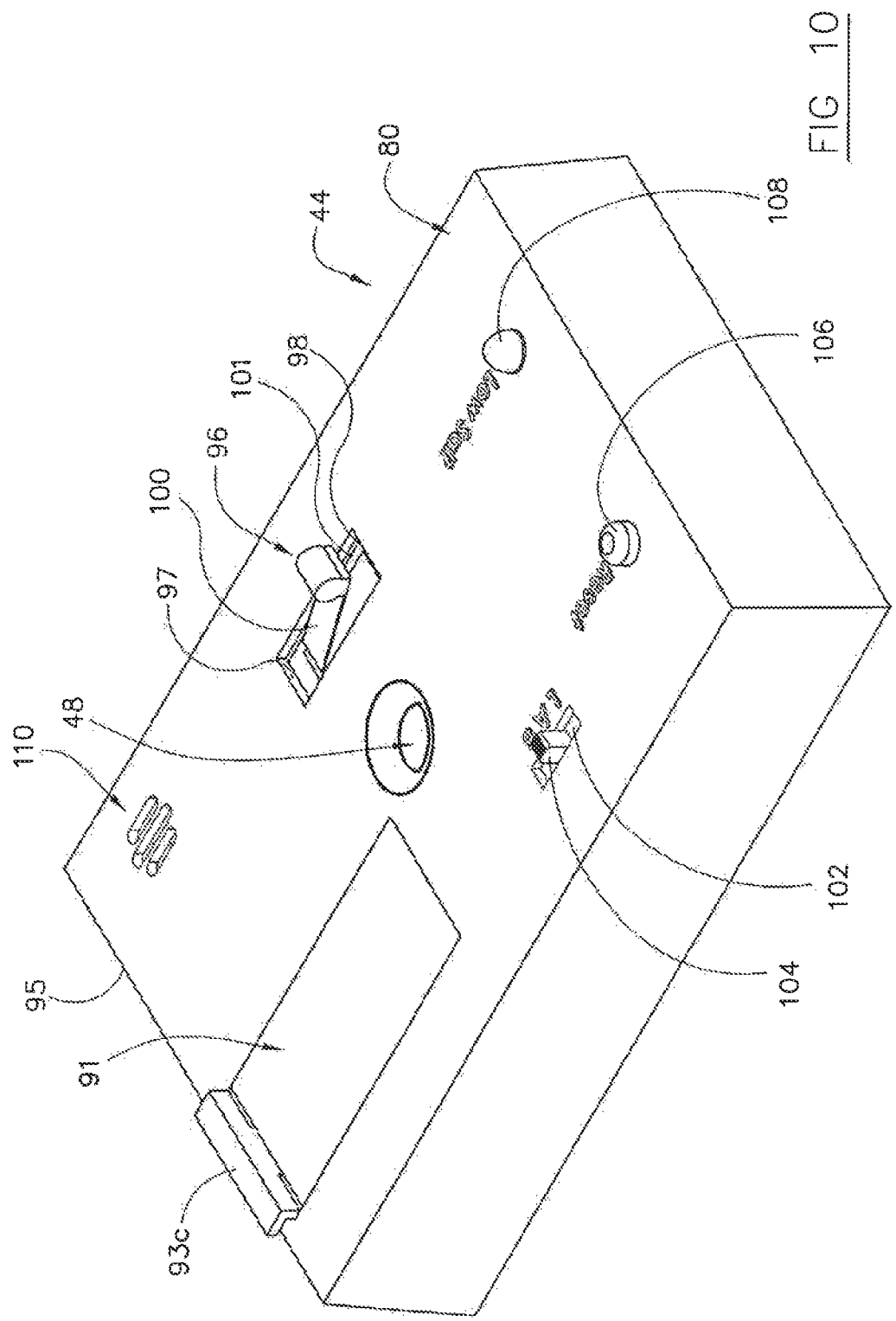
FIG. 10 is an isometric view of the sensor of the monitoring device of FIG. 9.
Figure 11:
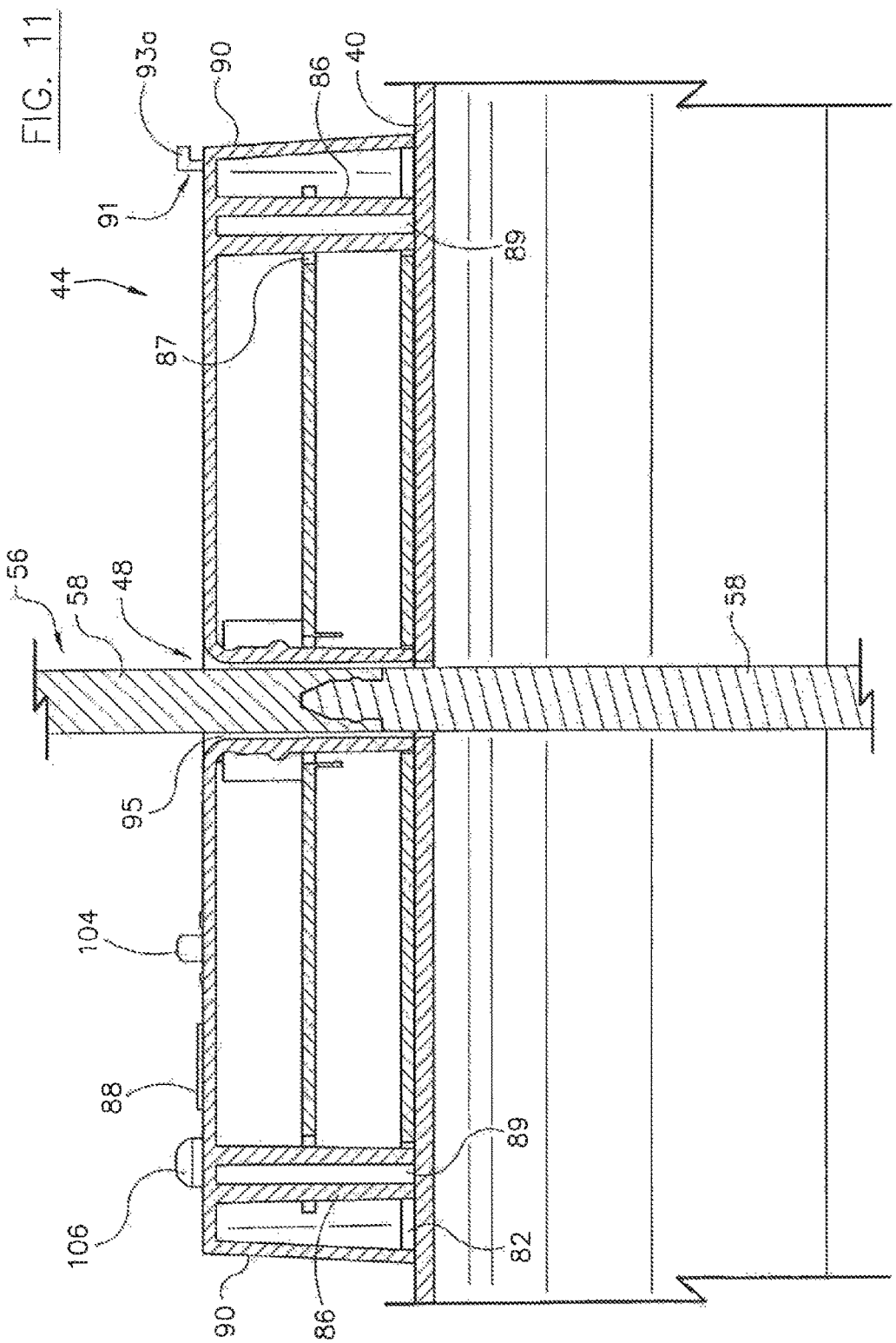
FIG. 11 is a circular cross-sectional view along line 11-11 of FIG. 2.

The central member 56 is adaptable for use with containers 30 having various sizes due to the construction of the central member 56 from a number of modular segments 58. As best shown in FIGS. 2, 5, and 8, each segment 58 preferably includes a generally cylindrical body portion 60 that supports protruding attachment 62 at one end and a recess 64 at the opposite end. The attachment 62 preferably has an outer end 66 spaced from the body portion 60 that is generally frustoconical in shape, and a cylindrical base 68 extending from the body portion 60 to the outer end 66. The base 68 also includes a peripheral flange 69 spaced between the outer end 66 and the body portion 60.

The recess 64 is shaped to be matingly engageable with the attachment 62, such that the recess 64 includes an inner tapered end 70, a cylindrical bore 71, and a peripheral notch 72 spaced from the tapered end 70. Consequently, when an attachment 62 on one body portion 60 is inserted into a recess 64 on an adjacent body portion 60, the respective body portions 60 are engaged with one another as best shown in FIG. 8. Any number of modular segments 58 can be joined or releasably secured in this manner to construct a central member or rod 56 having the appropriate length for a given tank 30, allowing the detection mechanism 46 to be adapted for use with any size water softening tank 30. Further, in order to engage the lower disk member 52 and upper disk member 54 with the respective modular segments 58 on opposite ends of the central member 56, each of the lower member 52 and upper member 54 includes a hub 74 including a central sleeve 75 (FIG. 2) shaped identically to the recesses 64 and supported on the members by a number of spaced, triangular ribs 76, best shown in FIG. 7. Thus, each of the lower member 52 and upper 54 is adapted to receive and engage an attachment 62 on a modular segment 58 in the manner shown in FIG. 8.

Figure 6:
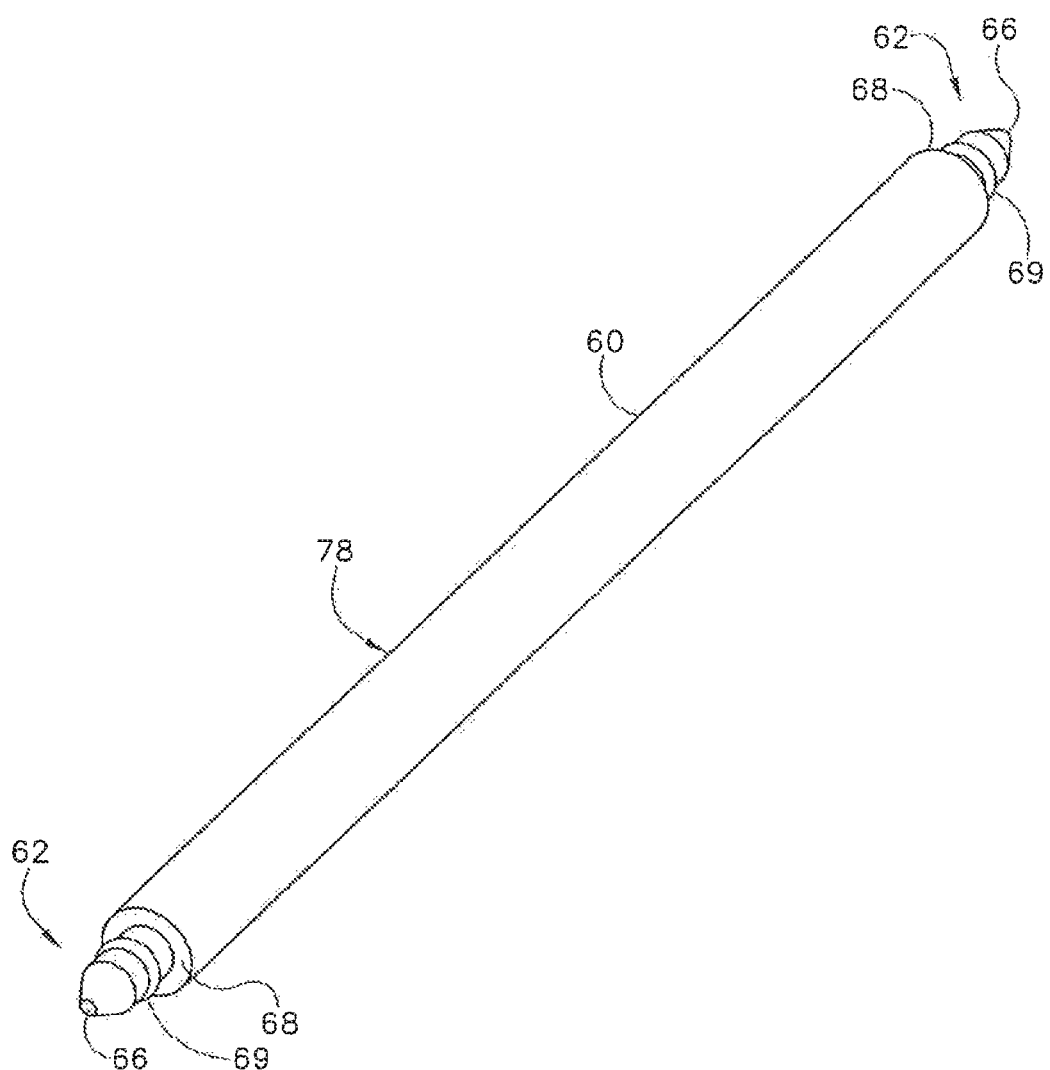
FIG. 6 is an isometric view of a second embodiment of a modular component of the direct detection mechanism of FIG. 4.
Figure 7:
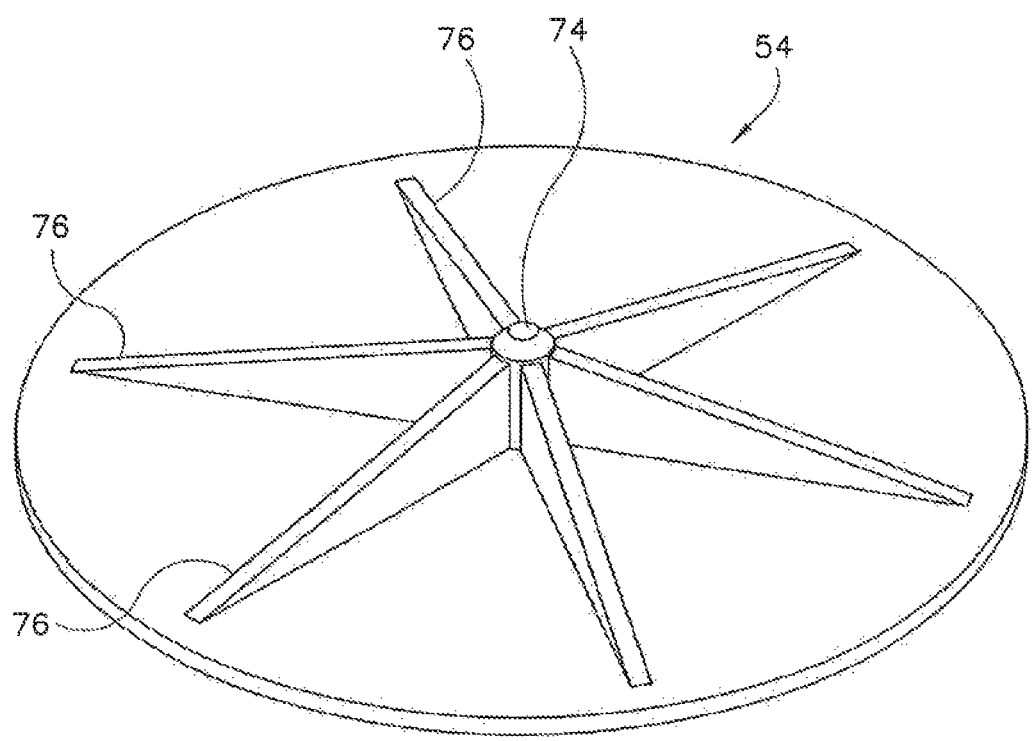
FIG. 7 is an isometric view of an end plate of the direct detection mechanism of FIG. 4.

As one end of each segment 58 has a recess 64, in order to enable one of the lower member 52 or the upper member 54 to be secured to the central member 56, an end segment 78, best shown in FIG. 6, is also used to form the central member 56. The end segment 78 is formed similar to the segments 58 with the exception of a second attachment 62 positioned on one end of the end segment 78 where the recess 64 is located on a segment 58, such that the end segment 78 can engage both the sleeve 75 in one of the lower member 52 or upper member 54 and the recess 64 in the adjacent modular segment 58.

Figure 12:
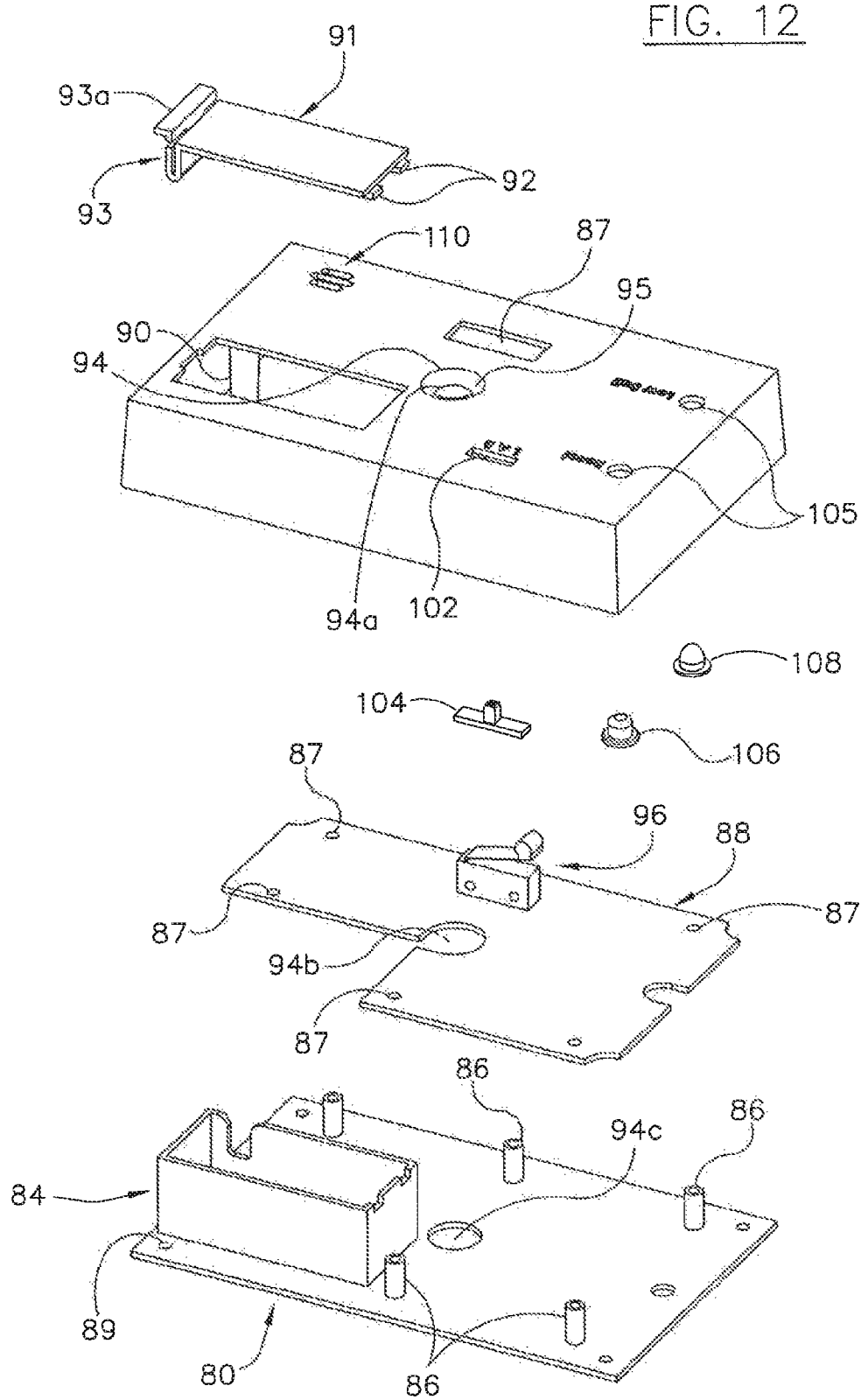
FIG. 12 is an exploded isometric view of the sensor of FIG. 10.
Figure 13:
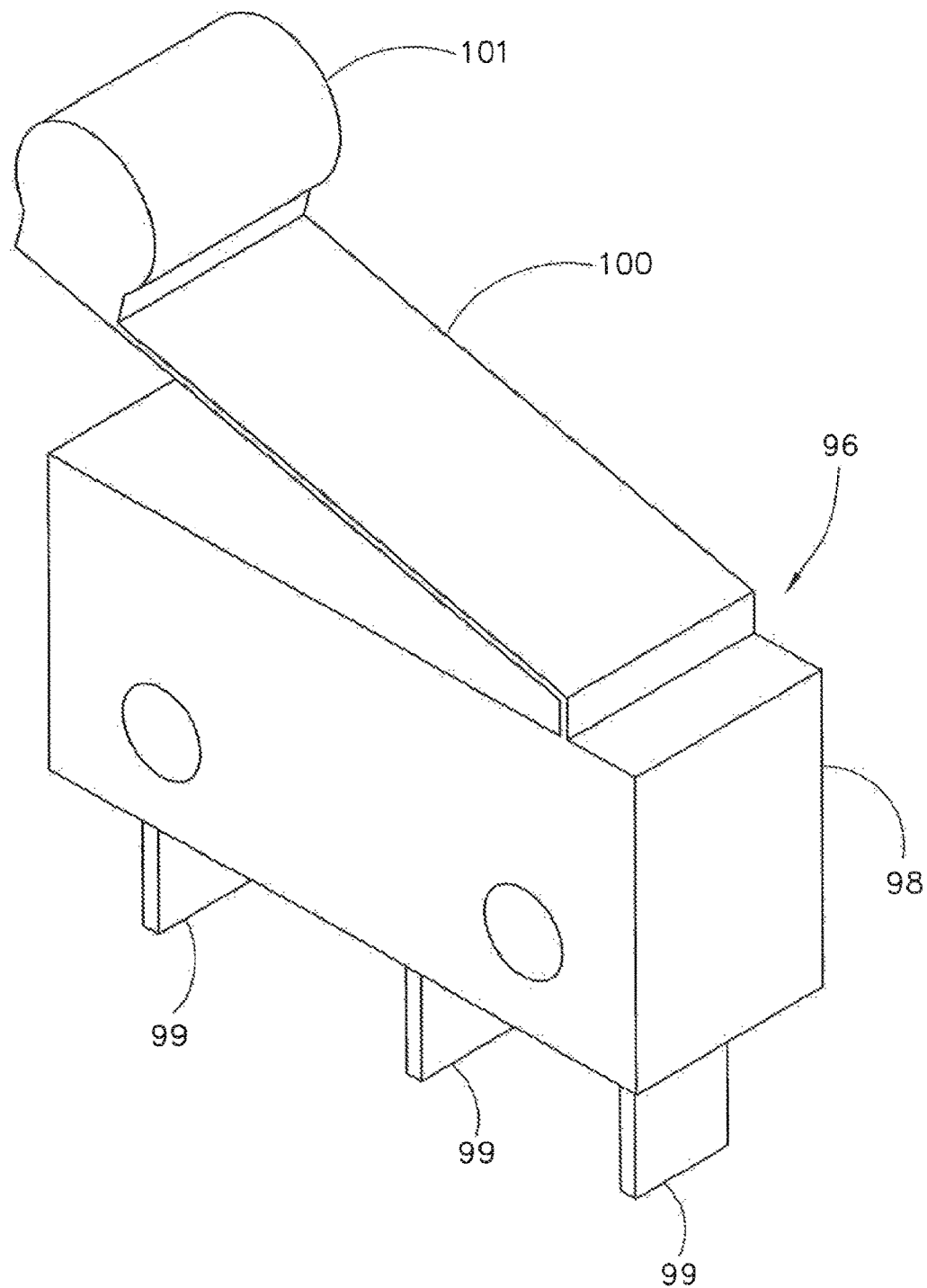
FIG. 13 is an isometric view of a limit switch of the sensor of FIG. 12.

Referring now to FIGS. 9-13, the sensor 44 through which the detection mechanism 46 extends is illustrated as including a generally rectangular housing 80 that is fixed to the cover 40. As best shown in FIG. 12, the housing 80 is secured to a base 82 having a power source receptacle 84, for receiving a battery (not shown) and a number of mounting stems 86 thereon. Alternatively, the base 82 can include a plug and cord (not shown) engageable with a conventional electrical outlet (not shown). A circuit plate 88 capable of supporting or having circuitry (not shown) printed thereon is positioned around the receptacle 84 and mounted to the stems 86 opposite the base 82 using suitable fasteners (not shown) inserted through openings 87 in the plate 88. The plate 88 helps to form the necessary electrical connections between the various components of the sensor 44. The housing 80 is fixed to the base 82 over the circuit plate 88 using fasteners (not shown) inserted through openings 89 in the base 82 and engaged with mounting channels 90 on the housing 80 aligned with the openings 89.

The housing 80 also includes a removable panel 91 having a pair of tabs 92 at one end and a biased lock 93 with a handle 93*a* at the opposite end. Tabs 92 are engageable with opposed ends of an opening 94 in the housing 80 to selectably expose the power source receptacle 84 in order to enable a replaceable power source, such as a battery (not shown), to be connected to the sensor 44 in any conventional manner and positioned and retained within the receptacle 84. The housing 80, base 82, and circuit plate 88 also each includes a central aperture 94*a*, 94*b* and 94*c*, respectively that are aligned with one another to form the opening 48 through which the central member 56 of the detection mechanism 46 extends. The aperture 94*a* in the housing 80 can also include a flexible skirt 95 extending into the aperture 94*a* around the central member 56 to prevent material from passing through the opening 48 and around the central member 56 into the tank 30. The skirt 95 may also act as a humidity seal.

In the embodiment shown, the power source within the receptacle 84 is connected via the circuit plate 88 to a limit switch 96 fixed to the circuit plate 88 and extending outwardly through a first slot 97 in the housing 80. The switch 96 includes a base 98 secured by prongs 99 to the circuit plate 88 and a biased arm 100 extending outwardly from the base 98 through the slot 97 and supporting a stop 101 opposite the base 98. The housing 80 also includes a second slot 102 that is spaced from the first slot 97 in which is disposed an operating switch 104 connected to the plate 88 and used to selectively change the operating mode of the sensor 44, i.e., to select light only (L), alarm only (A), or both (B), shown collectively as L, A, B positions. The housing 80 also preferably includes additional openings 105 for a reset button 106, an indicator lamp 108, and an audible alarm device 110 (e.g., a speaker) which are all connected to the plate 88 and allow the sensor 44 to provide visible and/or audible signals when a signal from the limit switch 96 is received by the sensor 44. Note that, like a smoke alarm, power is always on as long as a battery is installed. However, the alarm may also sound when battery power is low.

More specifically, in operation, once an amount of salt 202 has been placed within the body 32 of the tank 30, the cover 40 and monitoring device 42 are positioned over the body 32. The lower member 52 of the detection mechanism 46 is positioned on the upper level 200 of the salt 202. As the water softening system operates, the upper level 200 of the salt 202 within the tank 30 is lowered, thereby allowing the lower member 52 and detection mechanism 46 to slide downwardly with respect to the sensor 44. When the upper salt level 200 has reached a predetermined lower limit based on the length of the central member 56, the detection mechanism 46 is positioned with respect to the tank 30 such that the upper member 54 contacts and depresses the stop 101 and the arm 100 of the limit switch 96. The depressing of the arm 100 sends a signal from the switch 97 to the plate 88 that serves to operate the sensor 44 to emit a visual signal using the indicator lamp 108 and/or an audible signal using the speaker 110 to alert an individual to the low level of salt present within the tank 30. As will be more fully described below, the alarm indicator may be located at a position closer to the individual's living area but remote from the location of the sensor and the softener, for example, in the basement.

Figure 14:
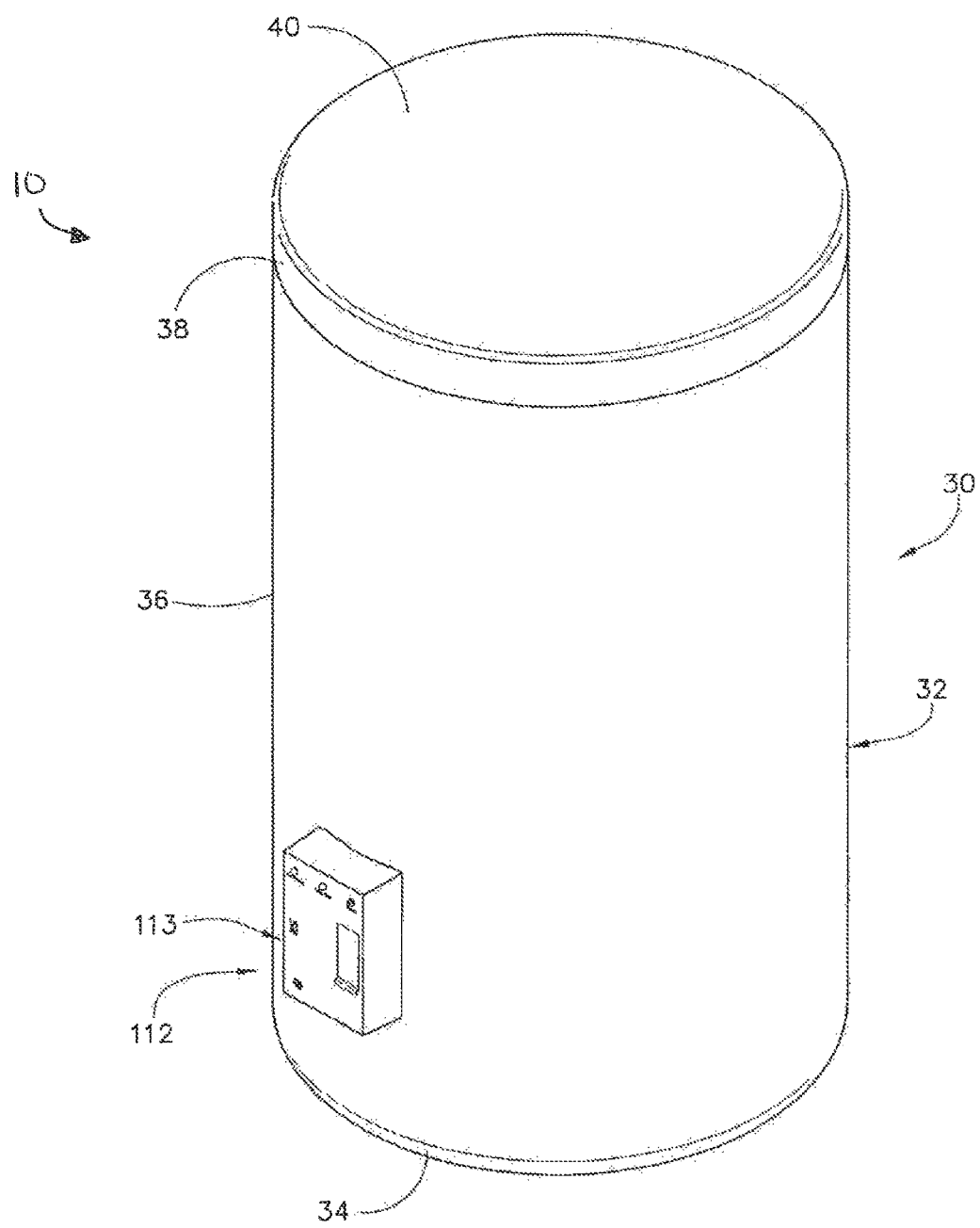
FIG. 14 is an isometric view of the system of the present invention having a water softener tank and a second embodiment of the monitoring device.
Figure 15:
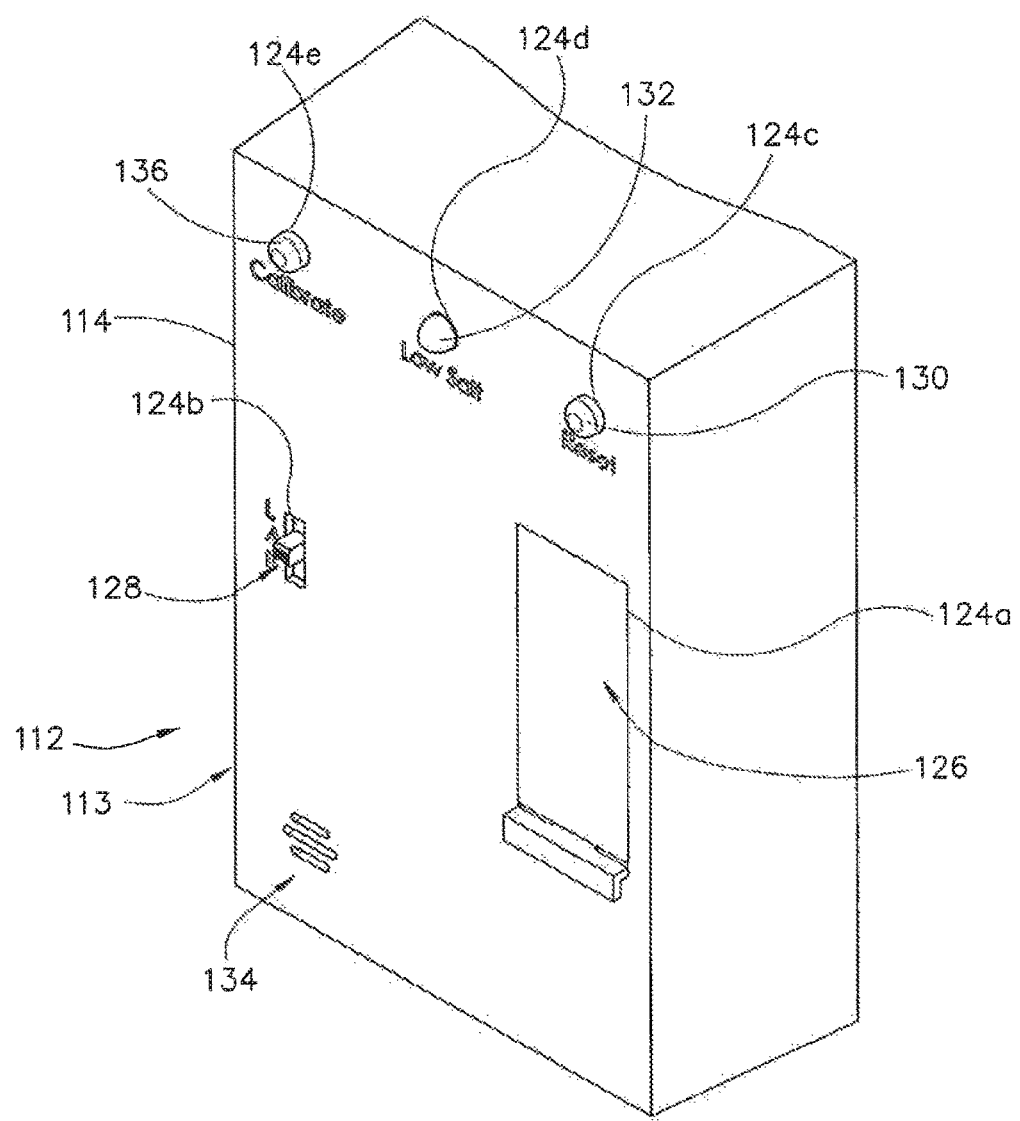
FIG. 15 is an isometric view of the sensor of the monitoring device of FIG. 14.

Referring now to FIGS. 14-16, in a second embodiment of the present invention, the system 10 includes a monitoring device 112 that includes a sensor 113 mounted to the sidewall 36 of the body 32 of the tank 30 adjacent the lower end 34. The sensor 113 is formed similarly to the sensor 44 and includes a housing 114 secured to a base 116 including a power source receptacle 118 and a number of mounting stems 120 over a circuit plate 122 secured to the mounting stems 120 around the receptacle 118. The housing 114 is affixed to the base 116 in a conventional manner similar to that discussed previously and includes openings 124*a*-124*d* in which are located a removable panel 126, an operating switch 128, a reset button 130, and an indicator lamp 132, as well as a speaker 134, similarly to the housing 80.

However, the monitoring device 112 does not include a direct detection mechanism 46 as in the previous embodiment, but performs the monitoring function utilizing an indirect detection mechanism (not shown). The detection mechanism utilized by the device 112 is a mechanism that is constructed and functions similarly to that shown in Heger U.S. Pat. No. 6,023,159, which is herein incorporated by reference. Specifically, in this mechanism, the sensor 113 includes a means for sensing, e.g., a capacitor plate (not shown) and a ground plate (not shown) disposed on or adjacent the base 116 near the sidewall 36 of the tank 30. The plate senses the capacitance of the material within the tank 30 immediately adjacent the device 112 and compares this capacitance value to a reference value stored within the device 112. The reference value is a value corresponding to a condition where the upper level 200 of salt 202 within the tank or container 30 has reached a lower limit approximately just beneath the level of the device 112. The reference value is determined and stored in any suitable manner, e.g., on a computer chip, within the device 112 by positioning the device 112 against the tank 30 either prior to the addition of salt to the tank 30 or above the upper level 200 of the salt 202 within the tank 30 and sensing the capacitance of the tank 30 without any salt 202 adjacent the device 112 by depressing a calibrate button 136 disposed on the housing 114 in an opening 124*e*. The device 112 can also effectively monitor the upper level 200 of the salt 202 within the tank 30 at preselected intervals utilizing a timer (not shown) located within the device 112 and connected to the indirect detection mechanism to selectively operate the detection mechanism at the end of each interval measured by the timer.

When the device 112 determines the salt level in the tank 30, the capacitance of the material within the tank 30 is measured by the detection mechanism, and this actual capacitance value is compared with the calibration or reference value stored in the device 112. If the actual capacitance value is a predetermined percentage above the reference value, the device 112 can retest for the actual capacitance value to provide an assurance factor in the accuracy of actual value obtained by the device 112, and/or can initiate the timer to count down another interval prior to a subsequent test. However, if the actual capacitance value determined is equal to or above the reference value, the device or indicator 112 can initiate an audible and/or visual alarm or alert utilizing the speaker 134 and lamp 132 on the housing 114.

For example, two formulas are instructive for illustrating at least this embodiment and method. The first formula is for calibrating the device 112 at the point it is attached with the substance at the point of attachment. In terms of determining the level of substance in a container, i.e., salt in the tank 30, one method preferably uses, e.g., software or a chip within the device 112 to look at the difference between a reference value and an actual value. The reference value is determined by the previously described calibration, at the point where the device is attached, with the tank filled, or at least with salt above the level at where the device is attached. That value is stored in the device. If the actual value is a predetermined percentage, e.g., 10%, greater than the reference value, the device will notify the user of the low salt condition. Thus, the formula for this operation can be represented as follows:

Notify If: Actual Value>(Reference Value+(Reference Value·times·10%))

The second formula can be for calibrating the device 112 over an empty spot on the tank 30 or a spot where the salt is below the level that the device is attached. The device can also be configured to be calibrated over an empty tank. In this method, if the actual value is less than a predetermined percentage, e.g., 10%, greater than the reference value, the device will notify the user of the low salt condition. Thus, the formula for this operation can be represented as follows:

Notify If: Actual Value<(Reference Value+(Reference Value·times·10%))

In an alternative construction to the embodiment of the device 112 shown in FIG. 17, the device 112 can incorporate a dedicated reference capacitance value device 138 that is fixed to the sidewall 36 of the tank 30 adjacent the upper end 38. The device 138 is constructed and operates identically to the device 112 and is positioned to enable the device 138 to continually obtain a capacitance value for the tank 30 at a location where no salt is present within the tank 30. Once obtained, the device 138 can transmit this value to the monitoring device 112 via a conduit 140, or other suitable wired or wireless connection, in order to continually supply and/or update the reference value used by the monitoring device 112. Further, in addition to sensing a capacitance value based on the presence of solid or granular salt within the tank 30, the device 112 can be configured to be capable of sensing a capacitance value based upon the concentration of ions within the brine solution held in the tank 30 as a result of dissolved salt to provide an indication of salt within the tank 30. Once the salt is depleted, the brine solution lowers in the tank, and the device will sense the absence of salt at the attachment point.

Figure 17A:
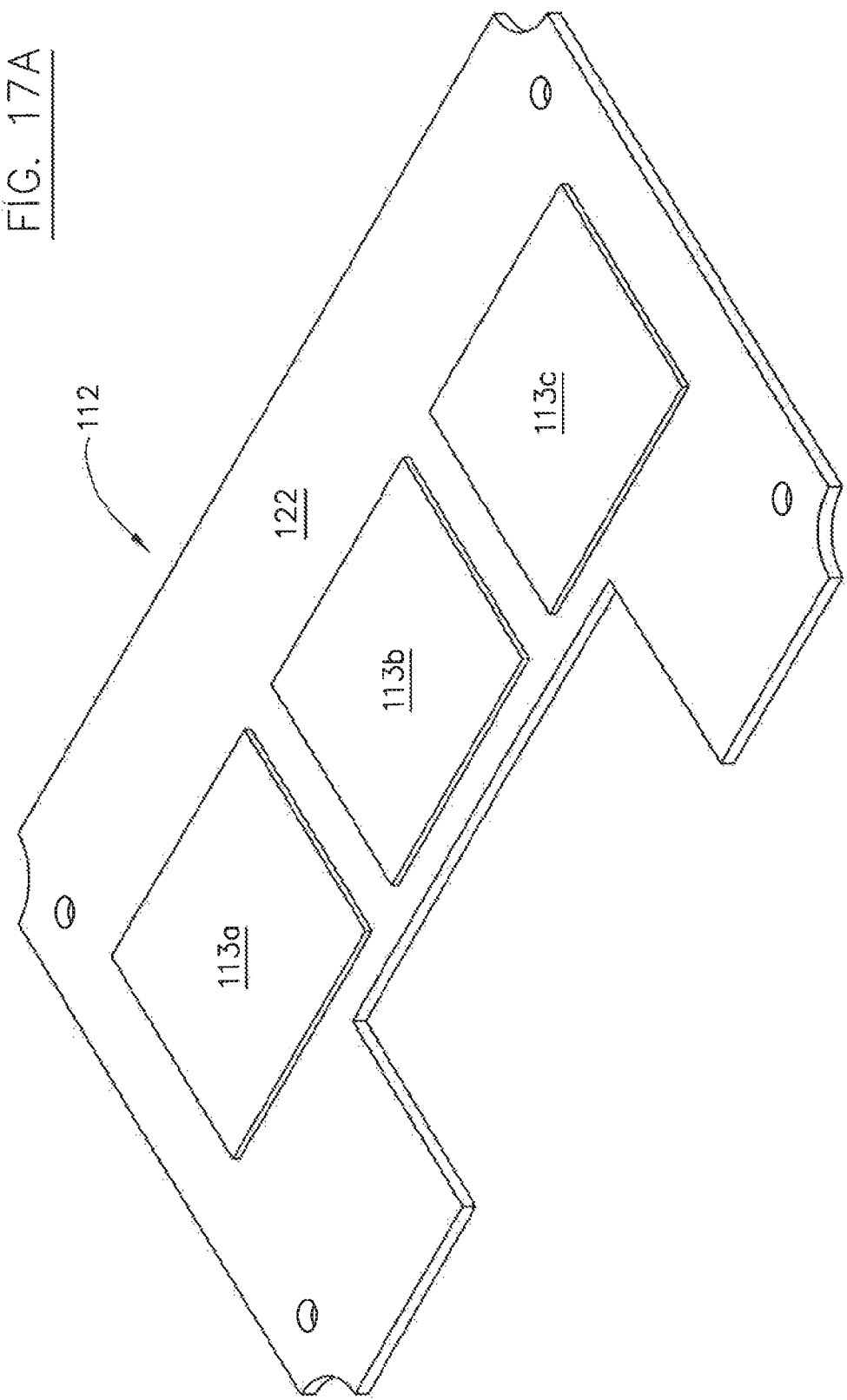
FIG. 17a is an isometric view of a plate of another embodiment of the monitoring device of the present invention.

As shown in FIG. 17a, in lieu of the capacitor connected by a cable, the base circuit 122 of the device 112 preferably has two capacitation plates 113a,b and one ground plate 113c. The plates preferably are the same size.

With regard to each of the aforementioned embodiments of the invention, in addition to the incorporation of the lamps 108 and 132 and speakers 110 and 134 on the respective housings 80 and 114, the monitoring devices 42 and 112 can utilize a salt level indicator, e.g., a remote alarm 142, best shown in FIGS. 18-19, that can be spaced from the device 42 or 112. The indicator 142 includes a receiver (not shown) that can receive a signal transmitted from the device 42, 112 in a known matter that causes the alarm 142 to activate and emit the audible and/or visual signal for an individual. The remote alarm 142 includes a base 144 having mounting stems 146 to which are secured a circuit plate 148 using fasteners (not shown). The base 144 may include a pair of prongs 150 that are operably connected to the plate 148 and engageable with a power source, e.g., a standard electrical outlet (not shown) in order to provide the power to the remote alarm mechanism 142. Alternatively, the power source may be a battery source for placement anywhere. After switching on the alarm 142 using a control switch 143, when a monitoring device 42 or 112 determines that the level of the salt within a tank 30 has reached a lower limit, the device 44 or 112 emits a signal that is received by the remote mechanism 142 which causes the mechanism 142 to actuate a lamp 151 and/or speaker 152 disposed on a housing 154 enclosing the circuit plate 148 and attached to the base 144 in order to provide a signal to an individual that the salt 202 within the tank 30 needs replenishing. Also, the alarm 142 includes a reset button 156 on the housing 154 so that the individual may disable the operation of the lamp 150 and/or speaker 152 after receiving the alert from the device 42 or 112, for example, pushing once disables selected audible alarm, pushing and holding disables audible alarm and light. The system will re-notify if salt is not added to the tank. The alarm 142 can be spaced a significant distance from the device 42 or 112 and in any direction, for example, a distance of between ten (10) feet and one hundred fifty (150) feet and with about 100 feet being most common.

Another embodiment of the inventive system 10 is shown in FIGS. 15-19. Best seen in FIG. 17, system 10 includes a monitoring device 112 that is preferably attached to exterior sidewall 36 of brine tank 30 at a measured level up from the bottom 34 of the tank 30. The device 112 may be attached through the use of double-sided tape, or adhesive, or a hook and loop system (Velcro) (not shown). First, the device 112 is placed on the empty portion of the brine tank 30 where salt media is not present, and a calibration button 136, is pressed (see, e.g., FIGS. 15-16). A sensing unit 113, preferably within device 112, senses the capacitance in the calibration position which is stored in memory (not shown). An additional option would use a secondary sensing unit 138 attached to the primary sensing unit 113 by an electrical ribbon cable 140. The secondary sensing unit 138 preferably is attached near top portion 38 of the tank 30, as shown. The monitoring device 112 is then attached to the lower portion of the brine tank 30 at a measured distance from bottom portion 34 where the substance, e.g., salt media, is present.

Standard residential water softeners regenerate (i.e., use salt) on a repetitive schedule. The length of the cycle is dependent on the amount of water that is used in the residence. This interval varies in increments of days (longer or shorter depending on water use). The monitoring device 112 only needs to test for the absence of salt media at the level where the device 112 is attached at an interval that is less than or equal to twice the interval that it regenerates. Therefore, the unit has the capability through the use of programming or a switch (not shown) for the user to select the intervals that they want the device or unit to check for the absence of salt media. This setup dramatically increases the life of the battery that runs the sensor/sending unit 113. Based on the selection of interval, the monitoring device 112 tests for capacitance change, e.g., the absence of salt media at a certain level, using only the sensing unit 113, with the stored capacitance value discussed above. Alternatively, the monitoring device 112 may compare the capacitance level at the secondary sensing unit 138 to that at the primary sensing unit 113. If the device 112 detects the presence of salt media, it will perform multiple additional tests, and if the results are the same, the device 112 will not send an alert signal to the low salt indicator. If the device 112 detects the absence of salt media at the level at where it is attached, it will again perform multiple tests. If those test results are the same, the device will trigger an alert signal as described above.

The monitoring device 112 is capable of giving a warning, e.g., an audible alert (A) at the tank only, visual alert (L) at the tank only, both an audible and visual alert (B) at the tank, and or a combination of the same through a remote receiving unit 142. (See, e.g., instructional indicia L, A, B near switch 128 in FIG. 15). The user can input this into the device 112 or choose the alert method through a selector switch 128 (best shown in FIG. 16). They may also have a built-in transmitting unit (not shown) that can transmit a wireless remote signal to a receiving unit or low level indicator 142, as shown in FIG. 18, plugged into a standard 110 volt outlet or power source located within a set distance of about 100' within the residence or building.

The audible warning or alert (A) at the monitoring device 112 or receiving unit 142 is heard through preferably a miniature speaker 152 or piazzo buzzer and the visual alert is done through preferably the use of light (L), e.g., LEDs. The alert type is selectable, e.g., by switch 128, by the user at the monitoring device 112 and the receiving unit 142. Not only does this allow the user to select options they may prefer, it also gives options for those that are hearing or seeing impaired. This option also gives the manufacturer the ability to sell a monitoring device 112 that only works at the brine tank or selling one that adds on as an option the remote receiving unit 142.

If the audible alert-only-type signal is chosen, the alert can be silenced by pressing and holding the reset button 156 on the receiving unit 142 and then button 130 on the monitoring device 112 (see, e.g., FIG. 18). If audible and visual alerts are chosen, pressing and holding either reset button 156, 130 will only silence the audible alert continuing to notify the user of the low salt condition through a light or LED 132, 151, until the low salt condition is corrected by adding salt. In either case, if the salt is not replenished within the chosen sense interval (e.g., one hour) after the initial alert, the monitoring device 112 will again trigger an audible and visual alert. This will repeat until the low salt condition is corrected. After the low salt condition is corrected, the device 112 preferably automatically resets itself to a normal operation condition. Note, e.g., the receiving unit or signaler 142 preferably receives a wireless transmission from the detection mechanism monitoring device 112.

The monitoring device 112 is also capable of giving off a separate distinguishable audible and visual alert notifying the user of a low battery condition. In one embodiment, the device 112 will also transmit a separate signal to the receiving unit 142 to give off the same low battery alert. The alert may be cancelled by the same procedure as canceling the low salt alerts. If the condition is not corrected by replacing the battery, the unit will also preferably resend to the remote receiving unit 142 the "low battery" condition signal, at the same intervals that it tests for low salt conditions.

Figure 20:
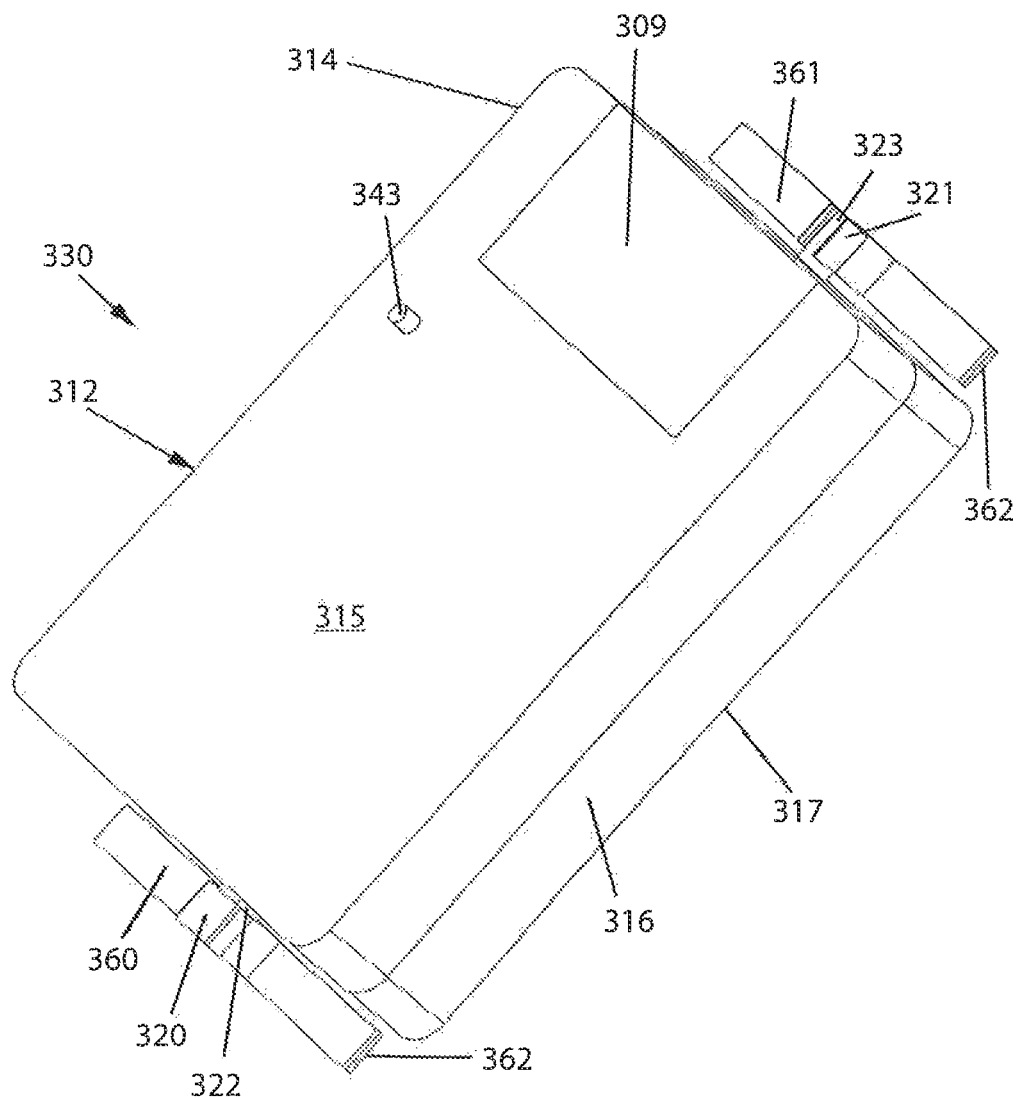
FIG. 20 is an isometric view of another embodiment of the monitoring device of the present invention.
Figure 21:
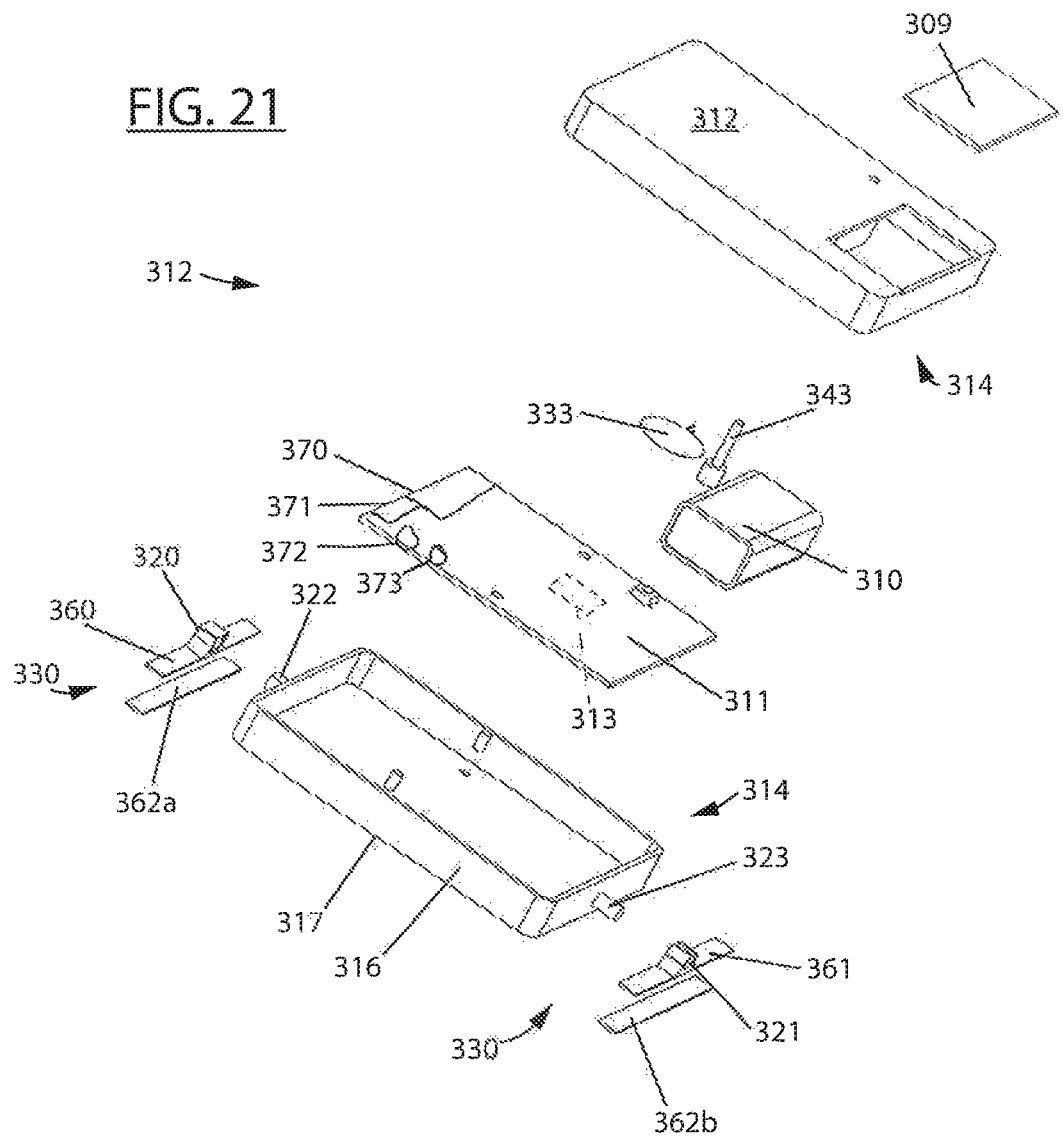
FIG. 21 is an exploded, isometric view of the monitoring device of FIG. 20.
Figure 22:
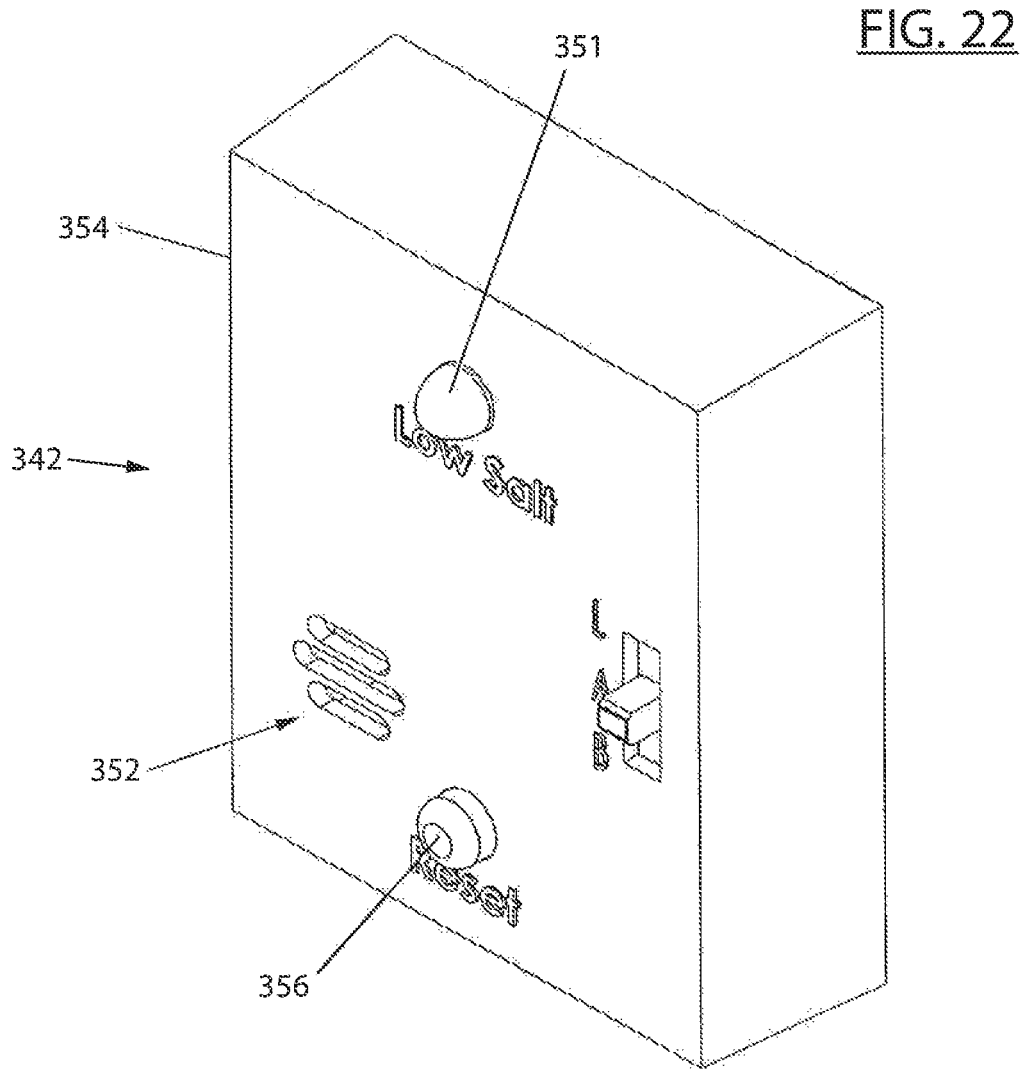
FIG. 22 is an isometric view of an alarm mechanism utilized with the monitoring device of the present invention.
Figure 23:
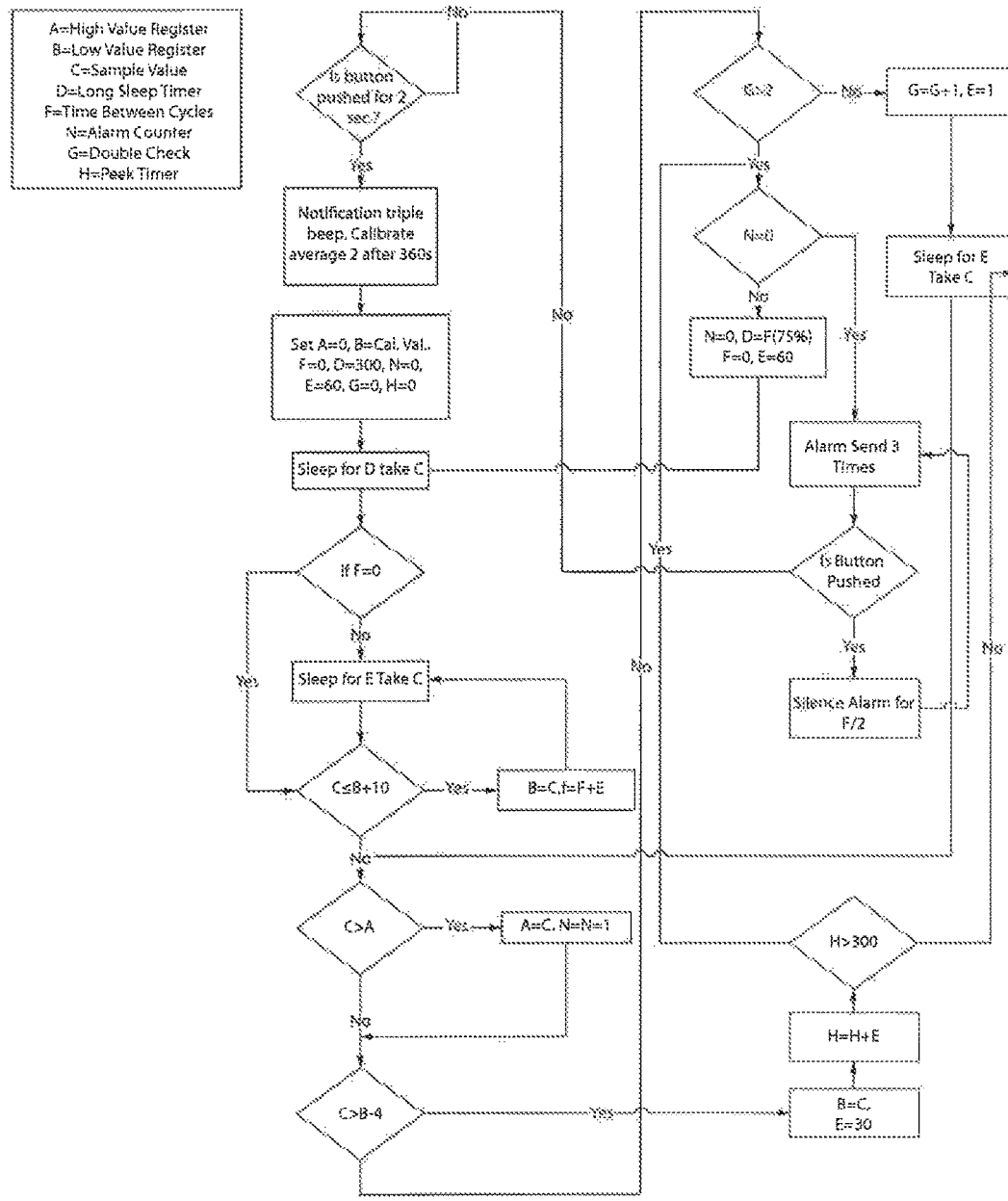
FIG. 23 is a flow chart showing steps performed by software of the present invention.

Referring now to FIGS. 20-22, a number of further embodiments of the present invention use software along with the capacitive-based system to reliably detect the level of salt within the tank. A computer chip 319 in the monitoring device 312 may be programmed with software 370. Thus, the device may have hardware and software components.

Figure 29:
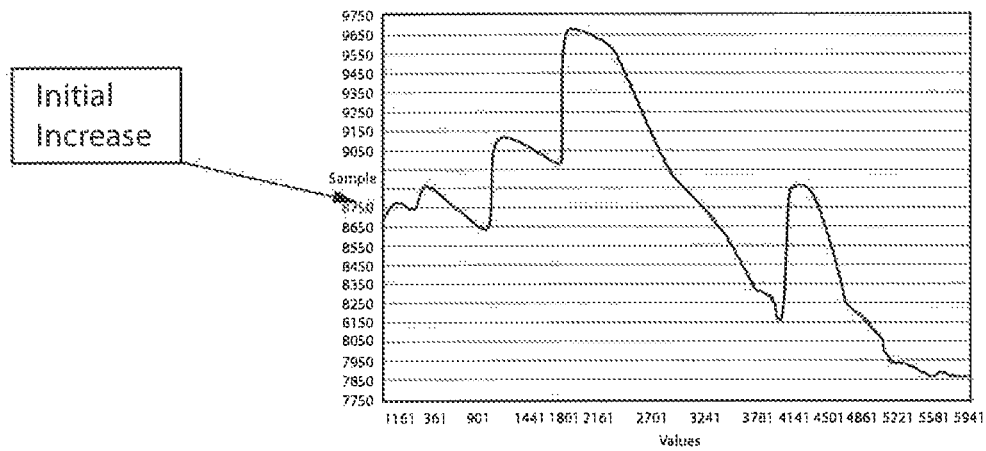
FIG. 29 is a graph showing the initial increase after starting the calibration sequence for one embodiment of the invention.

Different softener cycles contribute to unique problems in sensing with capacitance. The capacitive values may change dramatically during the different cycles due to factors other than the level of the salt decreasing. For example, when producing brine, the tank may contain solid salt or other solid material or media, brine solution, aqueous material like fresh water turning into brine, very little water or brine, salinic humidity, gases and salt build-up that make it difficult to accurately and repeatedly sense the level of salt in the tank. The capacitive values can go up by simply removing the cover from the tank and releasing gases and/or humidity from the tank. The values can go up while salt or other media is added to the tank and then go down. This causes difficulties when trying to set calibration points for determining alarm thresholds for capacitive sensing devices or finding the proper time to catch the changes in capacitance. See, e.g., the initial increase after the calibration sequence was started as shown in FIG. 29.

In one embodiment shown, the monitoring device 312 includes software 370 that determines the proper threshold 372 for setting the alarm point in dealing with the increasing and decreasing values of capacitance. The capacitive values are monitored during calibration and the software waits until the value peaks and/or goes down after the initial reading to prevent getting a false threshold. The threshold 372 can be a percentage increase over the calibration threshold determined via a calibration mechanism 373. This is done through the formula or software program shown below.

A=Capacitive Value
B=Place Holder
T=A period of Time
Check A
Let B=A
Check Time
Wait T
Check A
If A>B, Let B=A Goto Check Time
End
B=Calibration value or the threshold.

Figure 30:
FIG. 30 is a graph showing various water softener values for one embodiment of the invention.

Another embodiment includes software 370 that permits a user to place the monitoring device 312 on the tank without the need to set a threshold 372 for the device 312. During the normal cycles of the water softener making, using, and re-making brine, the capacitive values within the tank will go through peaks and valleys. The device 312 has software 370 on a chip or PC board 311 that makes use of this and either looks for peaks to be less than or equal to the previous peak during the brining cycle. One example of the steps taken by the software 370 is seen in the flowchart shown at FIG. 23. During the cycles of the softener, the peaks will either reach a maximum value that will either remain near the peak during subsequent regenerations, or decrease in value after the maximum peak has been reached. See FIG. 30 as an example. The software 370 could also be written to learn the differences between initial calibration values and peak values to optimize alarm points.

The software 370 could also be written to learn the differences between initial calibration values and peak values to optimize alarm points.

Another embodiment preferably includes software 370 to solve the problem of proper placement of the monitoring device 312 on the tank. The peaks and valleys of the capacitive values mentioned above are time and position dependent. If the device 312 is placed very low on the tank in the brine solution, the time between peaks and valleys can be shorter, and the percentage changes in capacitance can be smaller. If the device 312 is placed higher on the tank and/or out of the brine solution, the time between peaks and valleys can be longer and the capacitance changes can be larger. The problem is if the time between checks of capacitive values is too long, and/or the percentage increase or decrease that is looked for in the software 370, the actual change in capacitance can be missed. This often causes the system to fail to alarm. This is solved by giving the user the use of a variable-sensitivity setting. This is done through the use of timers 371 preferably in the software 370 and with different values associated with percentage increases or decreases associated with each timer value. The user can choose from multiple sensitivities which in turn may change the amount of time between sensing episodes and/or the amount of increase or decrease in capacitance relative to alarm threshold settings. This allows for increased life of the power source, e.g., battery 310, if lower sensitivity settings are chosen. It also allows for detecting smaller changes in capacitance on varying locations on the tank. An example of the sensitivities and the percentage increase or decrease is shown below:

T=0.5 hours and 0.005% of calibration value
T=1 hour and 1% of calibration value
T=1.5 hours and 2% of calibration value
T=2 hours and 4% of calibration value
T=4 hours and 8% of calibration value
T=8 hours and 12% of calibration value The user can choose the sensitivity through the use of a button or switch 343 that allows them to select the sensitivity. The receiving unit 342 shown in FIG. 22 gives audible alerts via a piazzo buzzer 333 to the level of sensitivity that is chosen.

Another embodiment includes software 370 that has the ability to measure the time between peaks and valleys of the capacitive values. This is useful in that it would allow the unit to learn and set the optimum time between sensing to increase battery life and to make the need to setting sensitivity unnecessary as the device will learn the proper interval. This would also allow for the monitoring device 312 to determine and average the preferred amount of time between regeneration cycles and also learn, on average, how often the container needs to be filled with salt or other media. Once the device 312 has this information, it can go into a sleep mode for longer periods of time and decrease energy use. This can also be used as a secondary means of determining and/or tracking time between tank regenerations. The flowchart on FIG. 23 also shows the preferred steps needed to perform this task.

Another embodiment includes software 370 to notify the user of a "dirty" tank condition or failure of the softener to regenerate. In such instances, a "dirty" tank condition includes salt or other media buildup on the inside of the salt tank that may render the sensing unit 313 useless. In other instances, the water softener may stop working and/or not regenerate at the appropriate intervals. In using the software 370 mentioned above, one can set a maximum time that the system has to see at least one peak or valley change in capacitive values. If one is not seen during this period of time, the monitoring device 312 notifies the user via an alarm of a dirty tank condition and/or faulty water softener. It should be noted that the above software functions could be accomplished through other means, such as electrical circuitry and/or mechanical means.

These preferred embodiments are configured to be connected to an irregular surface such as a cylindrical water softener tank via container attachment means 330 as shown in FIG. 21. The container attachment means 330 preferably attaches a housing 314, e.g., sealed plastic enclosure, to the container 30. The housing or enclosure 314 has a top piece 315 with battery cover 309 and bottom piece 316. The battery 310, PC board 311 and capacitive sensing unit 313 are contained within the housing 314. The container attachment means 330 preferably comprises tabs on each end 322, 323 of the housing 314 connected to flexible mounting brackets 360, 361 that are adhered to a container or tank (not shown).

In the embodiment shown, tabs 322, 323 are mounted directly to the bottom housing piece 316 and, in another embodiment not shown, they are removable. Tabs 322, 323 are offset from the bottom 317 of the enclosure 314 by the thickness of double-sided adhesive 362a,b to allow for the bottom enclosure piece 316 to contact the surface of the container. Mounting brackets 360, 361 are thin and flexible enough to conform to irregular shapes, while still allowing circuitry 311 within the enclosure 314 to maintain it natural shape, that being flat.

In an embodiment where the enclosure 314 is removable such as shown, a round male member or tab 323 is mounted on one end of the enclosure 314 and a rectangular protruding male member or tab 322 is mounted on the opposite end. The flexible mounting bracket 361 for the round tab 323 is designed to allow the round tab 323 to snap into a generally circular receiving female member or slot 321. The flexible mounting bracket 360 for the rectangular tab 322 is designed to allow the tab 322 to slide into a rectangular slot 320 in the flexible mounting bracket. The combination of the two tabs 322, 323 permits the easy removal and reattachment of the monitoring device 312 from the surface of the tank. Attaching the enclosure 314 requires sliding the rectangular tab 322 into the slot 320 of the corresponding flexible mounting bracket 360 and then snapping the round tab 323 into slot 321 of the corresponding bracket 361. The reverse sequence will remove the enclosure 314. When engaged, the rectangular shape of tab 322 and slot 320 prevents rotation of the enclosure 314 on the mounting surface. It is important to prevent any rotation of the enclosure 314 to ensure optimum and repeatable measurement by the monitoring device 312.

Another means of attaching the enclosure to an irregular surface is by the means of a hook and loop fastener (also known as Velcro). Indentations in the bottom 317 of the enclosure 314 are provided to compensate for the thickness of the combined hook and loop pieces (not shown) such that the housing or enclosure 314 is mounted flush with the surface. This allows for the enclosure 314 to be in close contact with the surface of the tank. The hook and loop pieces are preferably flexible enough to allow for connection to irregular surfaces.

Figure 24:
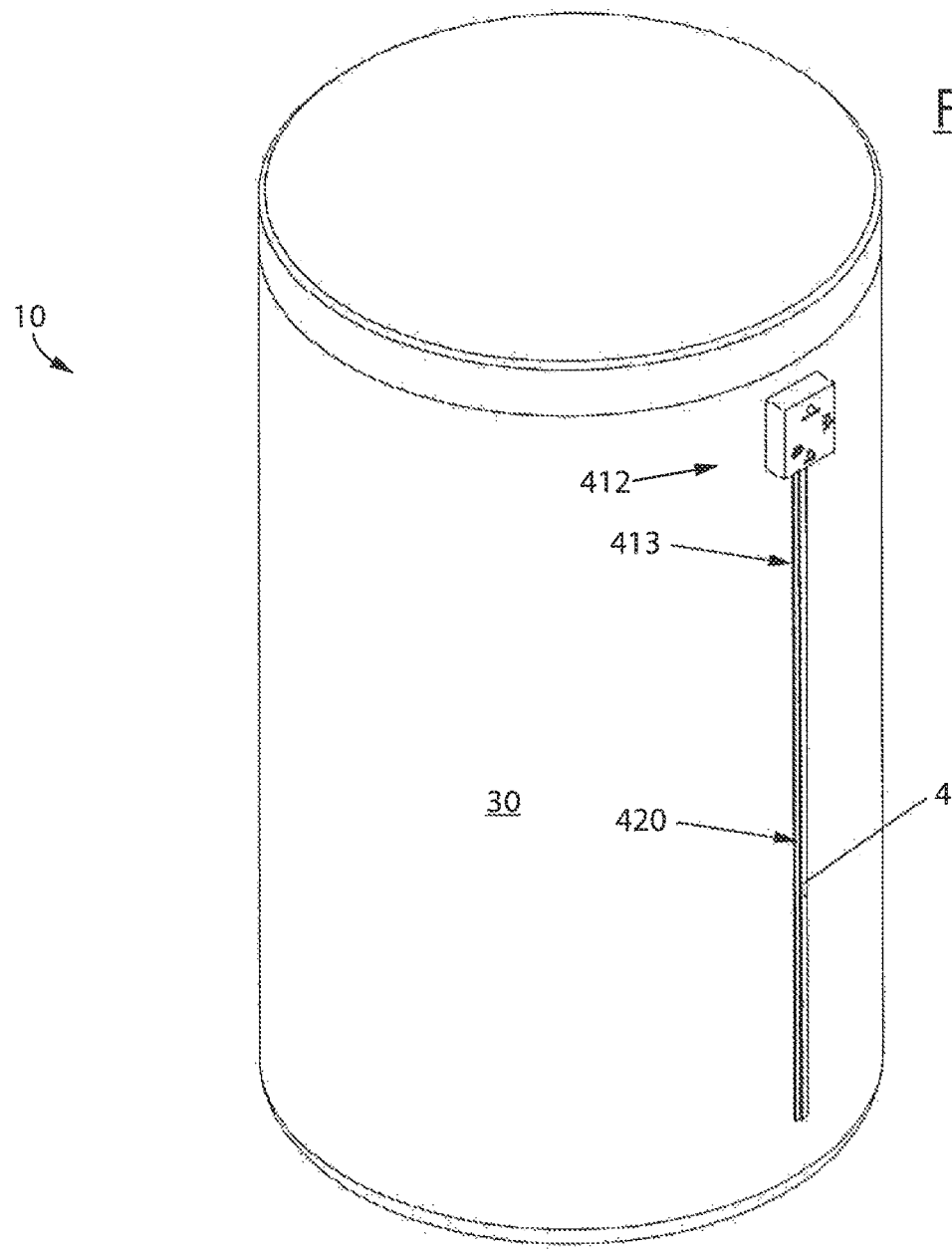
FIG. 24 is an isometric view of the system of the present invention having another embodiment of the monitoring device.
Figure 25:
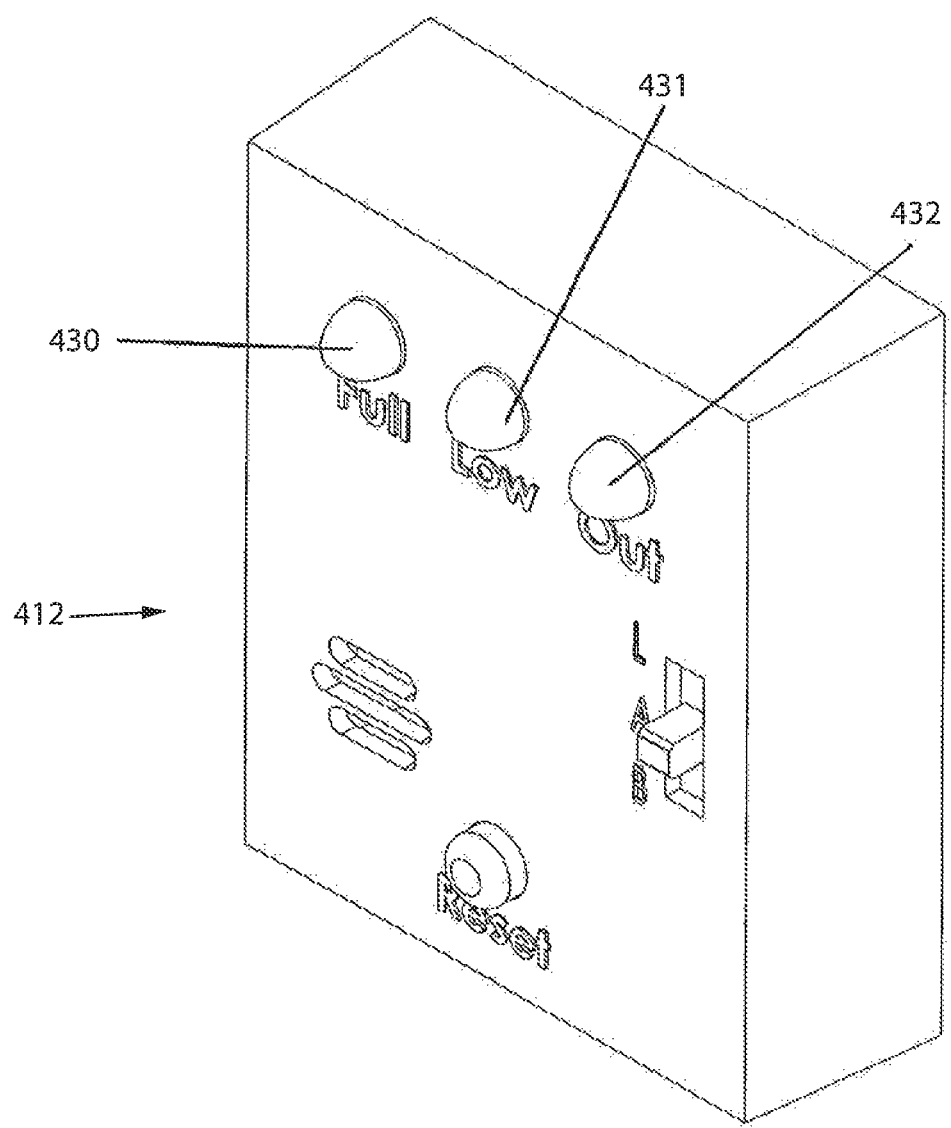
FIG. 25 is an isometric view of the monitoring device of FIG. 25.

Referring now to FIG. 24-25, a further embodiment consists of a system 10 with a capacitive-based monitoring device 412 and sensing unit 413 in an alternate arrangement. The system 10 includes a capacitive plate 420 that runs in the vertical direction of the brine tank 30. The capacitive plate 420 is preferably imbedded in plastic along with a ground plate 421 that also runs in the vertical direction of the brine tank 30. The length of the plates 420, 421 is determined by the height of the tank 30 and can be cut to length accordingly. The plates 420, 421 are connected to the monitoring device 412 through wires or other known methods. The capacitive plate 420 and ground plate 421 can alternatively be attached to the brine tank 30 by double-sided adhesive (not shown) or other means. Alternatively, the plates 420, 421 may be located on the inside of the tank 30 or molded or formed directly into the tank 30 itself. When the brine tank 30 is filled with salt or other media, the capacitive readings from the plates 420, 421 are scaled accordingly by the monitoring device 412 to determine the level of substance in the tank 30. As the salt or other substance is depleted, the readings will gradually increase and can be used as feedback. As shown in FIG. 25, the monitoring device 412 will preferably have lights or LEDs to indicate or display a discrete value such as full 430, low 431, and out 432. In another embodiment, the display will be a variable reading similar to a fuel gauge in a car.

Figure 26:
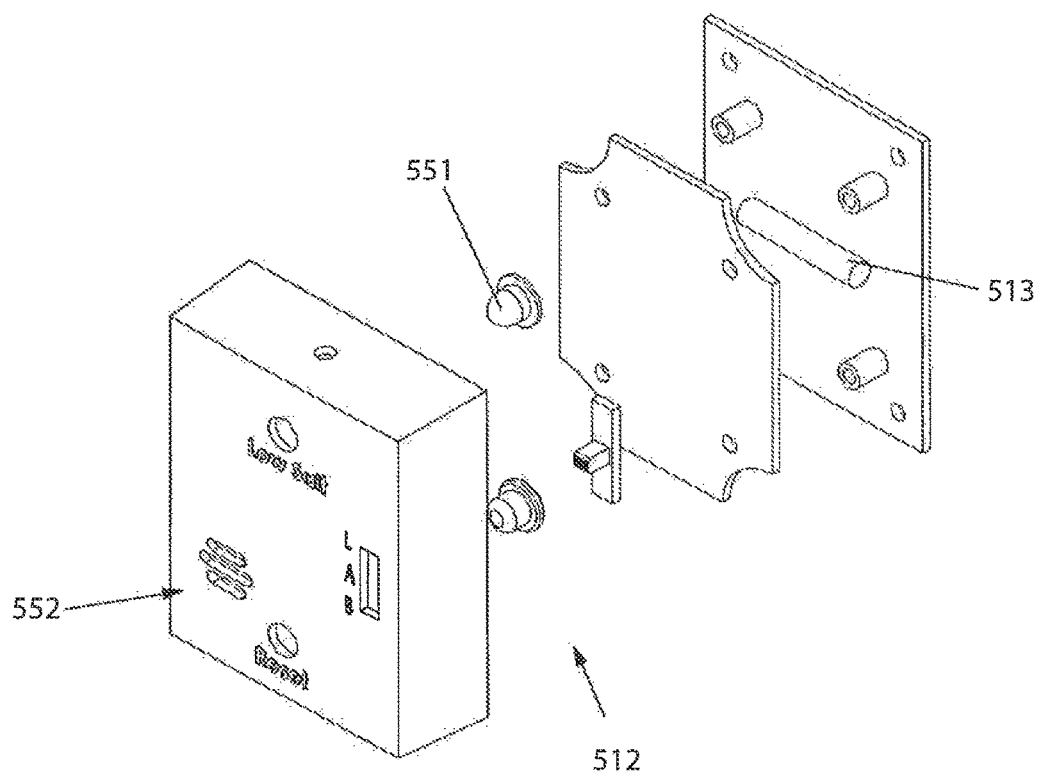
FIG. 26 is an exploded, isometric view of another monitoring device of the present invention.

Referring now to FIG. 26, a further embodiment of the monitoring device of the present system is shown. The monitoring device 512 is configured to sense the level of the brine solution through an inductance sensing unit 513 that is preferably contained therein. When salt is dissolved in the water in the tank 30 to form the brine solution, the solution is capable of being sensed by the inductance sensing unit 513, which is similar to those used in a typical commercially available metal detector. This is particularly effective when salt blocks are used in lieu of granular salt material. The blocks generally are placed farther away from the wall of the tank 30 than granular materials so sensing through capacitance is less effective. The salt blocks, however, displace fluid raising the upper level of the brine solution (i.e., increasing the volume). When the salt blocks are depleted, the solution level lowers a measurable amount (i.e., decreasing the volume). The monitoring device 512 preferably is placed on the outside of the tank 30 between the upper level of the brine solution when the salt is added and the level it drops to when the salt is depleted. The monitoring device 512 detects the absence of salt when the level drops below the inductance sensing unit 513 and notifies the user of the low salt condition. The monitoring device 512 can also be placed at a level low enough on the tank 30 so that it is always above the lowest level of brine solution/water. This is beneficial to the user who does not know what the upper and lower limits are. In this case, the sensing unit 513 would sense when the salt and brine solution are completely depleted, leaving only water. The unit 513 would sense this through the inductance circuit and notify the user of the no salt condition.

Figure 27:
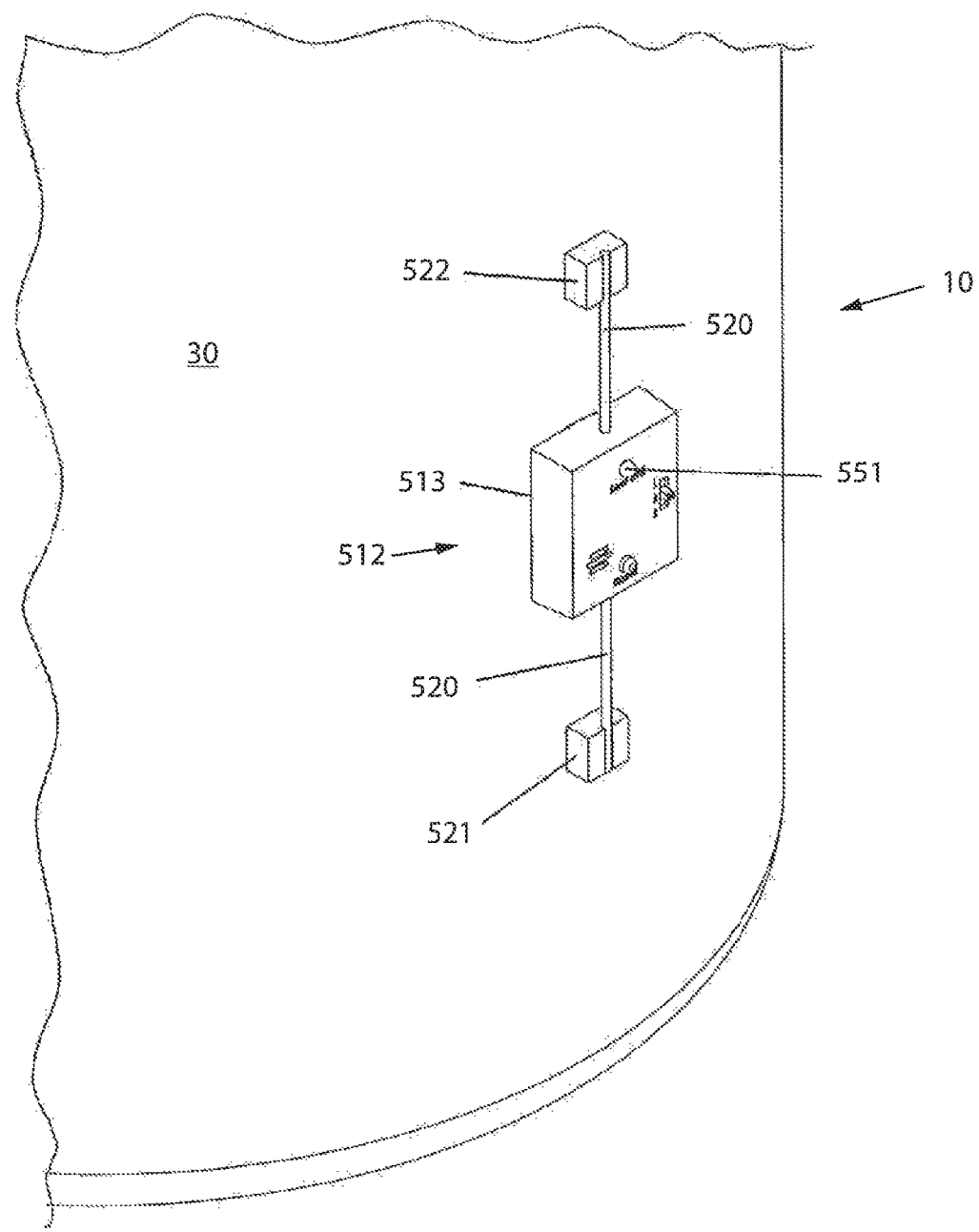
FIG. 27 is an isometric view of the system of the present invention having another embodiment of the monitoring device.

Referring to FIG. 27, the system 10 includes the inductive-based detection mechanism or sensor 513 of FIG. 26 with a means to slide up and down the tank 30 as shown. The sliding means or member preferably includes a shaft 520 fastened to the tank 30 on either or both ends, preferably by clamps 521, 522. Monitoring device 512 is then preferably mounted to the shaft 520 via a receiving cavity. After the tank has formed a brine solution, the device 512 is slid down until a light 551 or other means of notification comes on to indicate that the inductance and the level of the brine solution has been found. The monitoring device 512 is then secured to that position by a plastic set screw or other known means. Such a sensor may be referred to as a position-based sensor.

Figure 28:
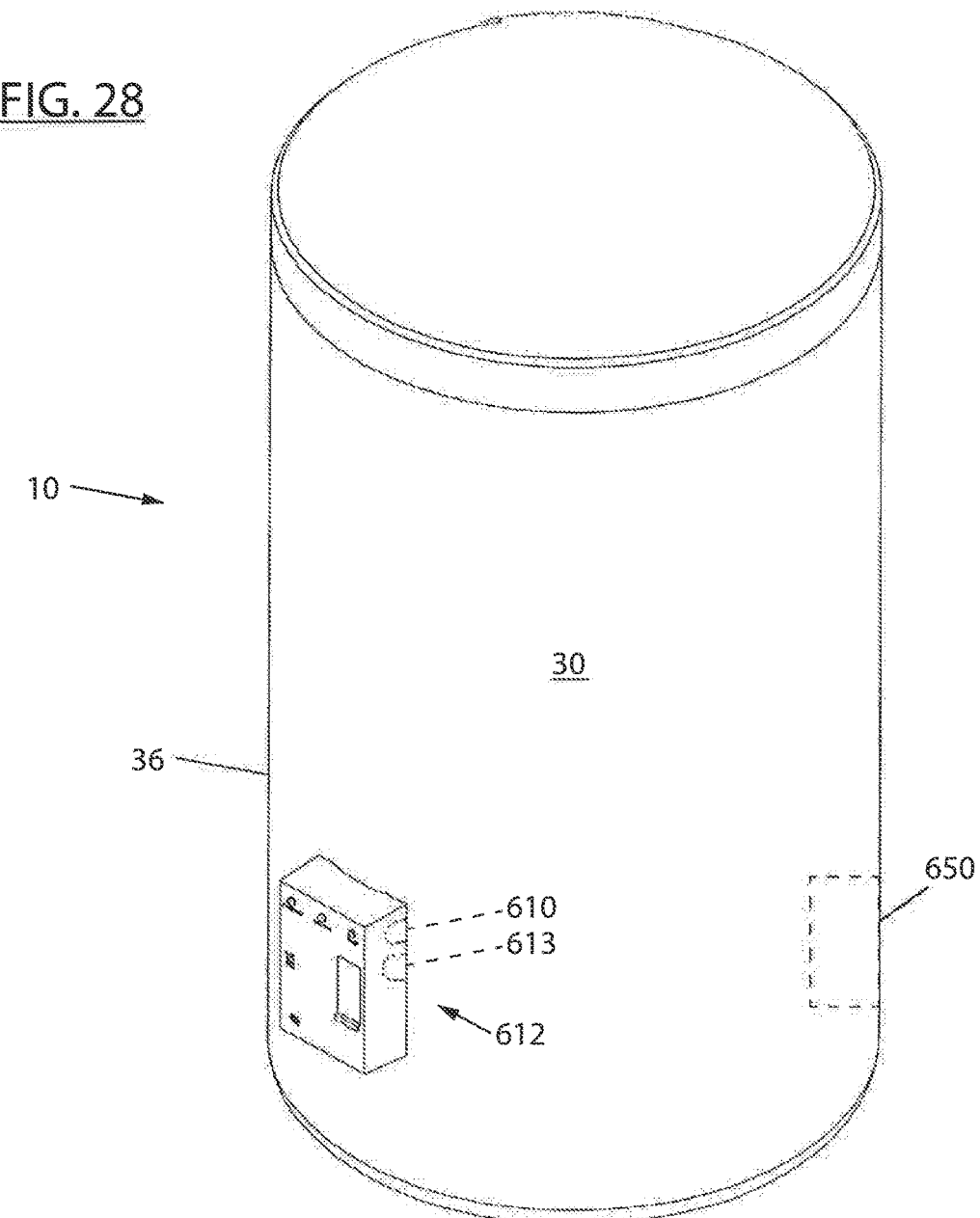
FIG. 28 is an isometric view of the system of the present invention having another embodiment of the monitoring device.

Referring to FIG. 28, another embodiment of the system 10 is shown that utilizes an infrared wave or beam emitter and detector. The monitoring device 612 is attached to the outside of the tank 30. An infrared beam emitter 610 generates a beam that passes through the tank wall 36. If salt or other infrared reflective media is present in the tank 30, the infrared beam will reflect off of it and be detected by the monitoring device 612 via an infrared sensing unit or wave detector 613. Once the level of the salt decreases past the level that the detector 613 is located on the tank 30, the infrared beam will no longer reflect back. The monitoring device 612 will then notify the user through a visual and/or audible alert notification as described above. Another embodiment consists of a second infrared sensing unit (shown in phantom as 650) that is attached to the opposite side of the tank 30 from the infrared beam emitter 610. When the level of salt is higher than the emitter 610, the salt will block detection by the second sensing unit 650. Once the level of salt falls below the level of the emitter 610 and second sensing unit 650, the infrared beam will pass through the tank into the second sensing unit 650, thereby enabling detection of the low salt condition. The use of the second sensing unit 650 will also allow for notification of a "dirty" tank condition where salt buildup on either wall of the tank over a certain period of time can be detected. This notification does not work when reflecting the infrared beam off the salt back to the detector 613.

In a final embodiment not shown, the monitoring system can utilize an emitter as disclosed in McEwan U.S. Pat. No. 5,512,834, which is herein incorporated by reference. Specifically, the beam source or emitter sends out waves of low frequency electromagnetic radiation (radio waves) into a tank, which bounce off of the salt within the tank for reflection back to a wave detector in a monitoring device. The angle of reflection of the waves to the device, and the duration of time for the waves to be emitted and reflected back to the device, can be used by the detector to determine the amount of salt within the tank. If the amount or level is below a lower limit, the device can activate an audible or visible alarm, as described previously. The sensing unit can be positioned anywhere on the tank or cover, so long as the device is properly calibrated for the position it is in, in a known manner.

While the preferred embodiments and best modes of utilizing the present invention have been disclosed above, other variations are also possible. For example, instead of a water softener salt tank, the system 10 may include any type of storage container used to hold an amount of material within the container. Further, while the structural components of each device in the system 10 are preferably formed of a non-corrosive, sealable, insulating plastic material for use with water softeners, any other suitable rigid material, such as a metal, could be used. Also, while the calibration device and alarm are shown as being single units used with a single device, these items can be configured to transmit or receive signals to and from multiple units and devices in order to monitor several containers or tanks simultaneously.

Figure 31:
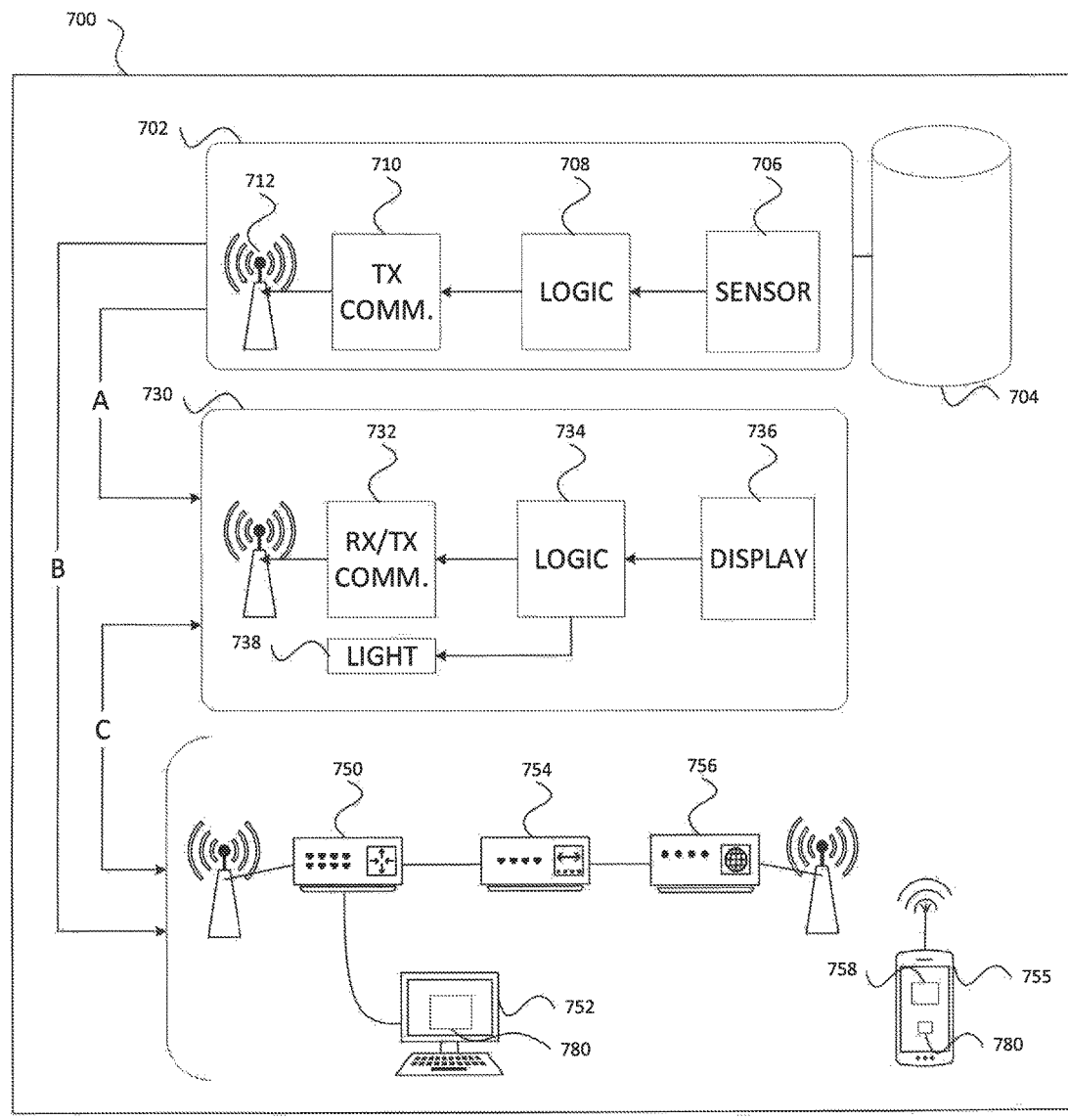
FIG. 31 is simplified diagram of a salt level monitoring system in accordance with additional aspects of the invention.

Referring now to FIG. 31, a simplified diagram of a salt level monitoring system 700 is provided in accordance with additional aspects of the invention. In the system 700, a monitoring device 702 can be attached to a water softener tank 704 to provide salt level sensing in one or more ways, as described above. Accordingly, the monitoring device 702 may include a salt level sensor 706 configured to sense a salt level in the water softener tank 702. The salt level sensor 706 can then provide a signal to a processor 708 or other logic element of the monitoring device 702 indicating that the salt level has fallen below a predetermined threshold when such condition occurs. Upon the salt level being detected below the threshold and the processor 708 receiving the signal, the processor 708 can prepare a message indicating an alert with respect to the salt level being low. The message can be wirelessly transmitted by a communications device 710 ("Tx") of the salt level sensor 706 using an antenna 712.

Figure 32:
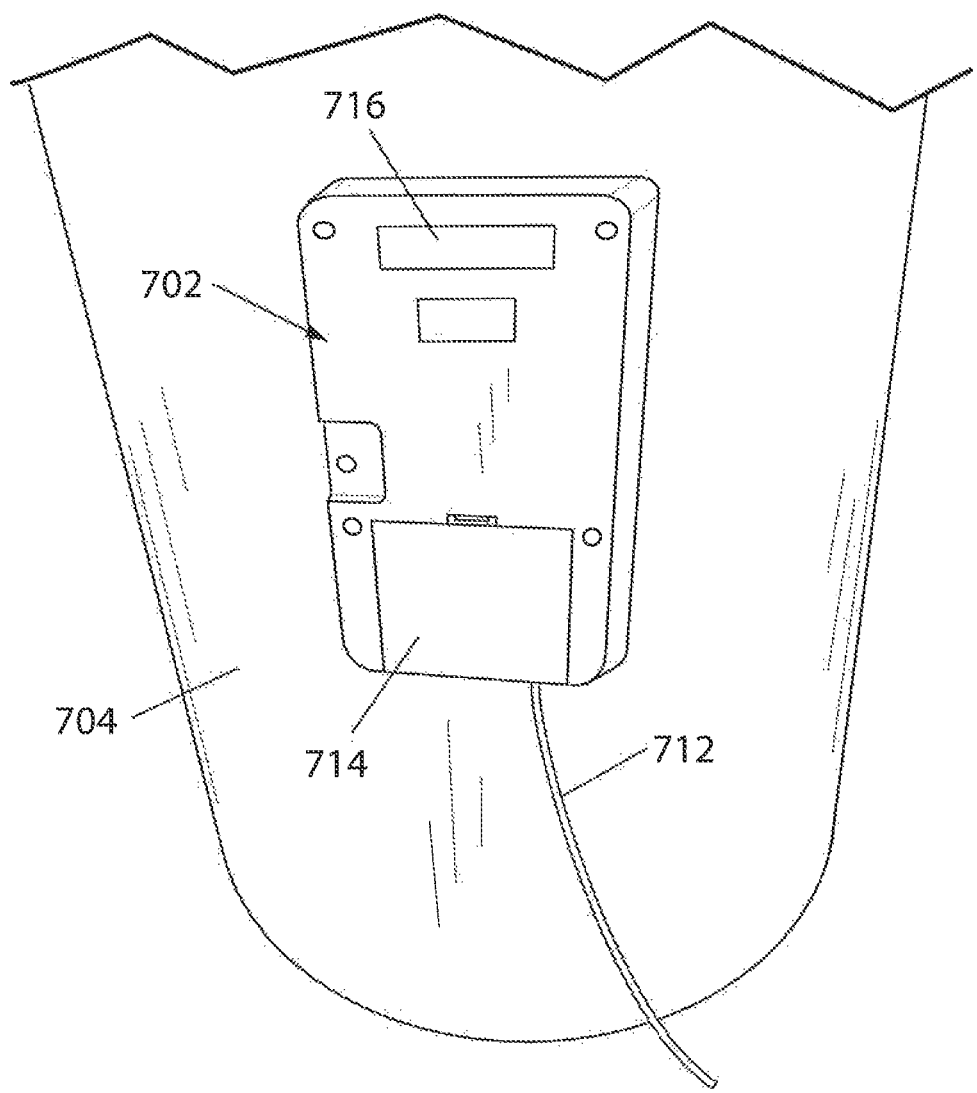
FIG. 32 is an isometric view of a monitoring device attached to a water softener tank in the system of FIG. 31.
Figure 33:
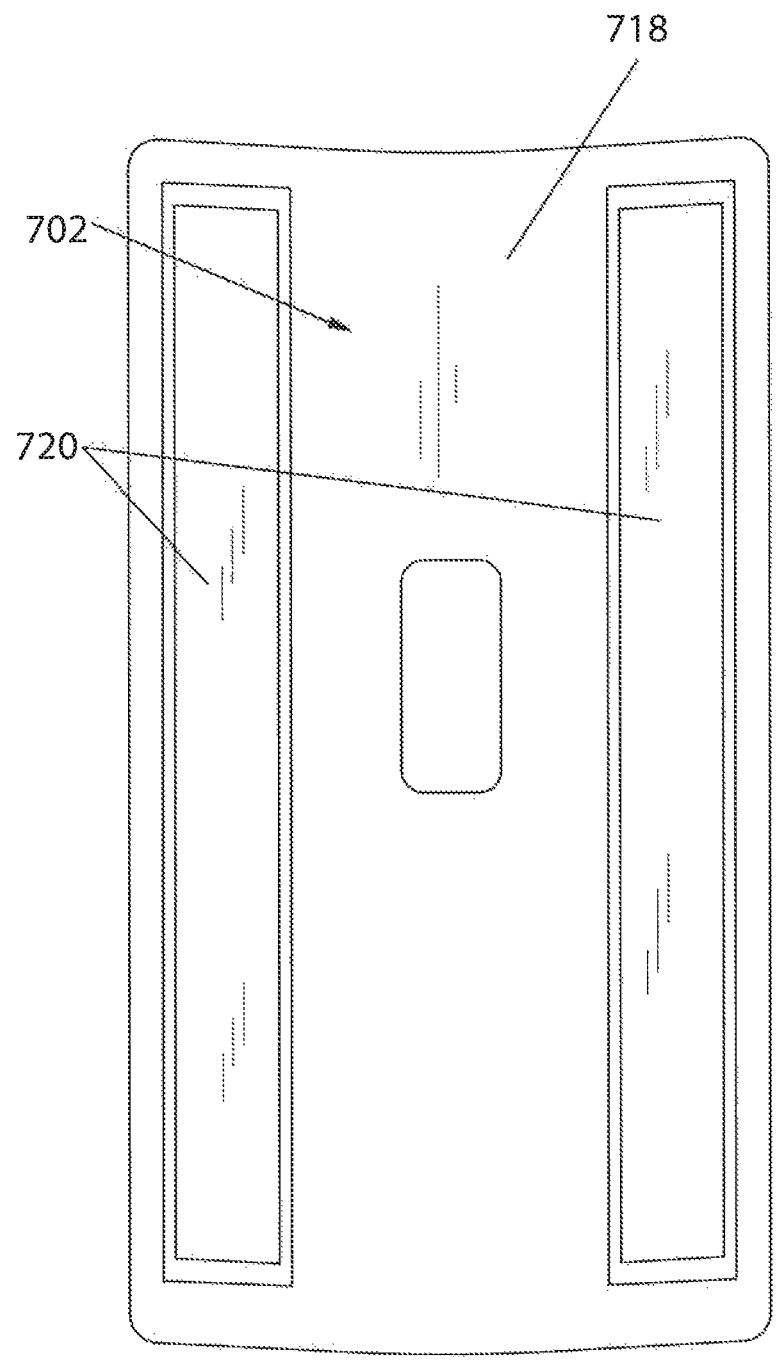
FIG. 33 is a back view of the monitoring device of FIG. 32.

With additional reference to FIG. 32, a front area of the monitoring device 702 can include a removable panel 714 for a power source, e.g., battery. The monitoring device 702 can also include a label 716 in the front area indicating details with respect to the monitoring device 702, including a model and/or revision number, network access information, passwords, an identifier for distinguishing communications between multiple monitoring devices which may be in proximity to one another, as well as distinguishing communications between monitoring devices for different customers, and the like. With additional reference to FIG. 33, a rear area of the monitoring device 702 can include a substantially concave contour 718 for form-fitting to the water softener tank 704. In addition, the rear area of the monitoring device 702 can include fastening strips 720, which may be adhesive and/or hook and loop fasteners (also known as Velcro), for ease of attachment to the water softener tank 704.

In the system 700, the aforementioned message indicating the alert can be wirelessly transmitted from the monitoring device 702 in various ways. In one aspect, labelled path "A", the monitoring device 702 can send the message to an alarm device 730. The alarm device 730 could be part of a Local Area Network (LAN) using an IEE 802.11 communications protocol, a Personal Area Networks (PAN) using an IEEE 802.15 communications protocol, or a Bluetooth, Mesh, Z-Wave or Zigbee network, for example. The alarm device 730 could be a dedicated remote monitoring system with wireless capability so that it can be positioned at a convenient location. Accordingly, the alarm device 730 could include a communications device 732 ("Rx") for wirelessly receiving the message, a processor 734 or other logic element for processing the received message, and a display 736, which could be an LCD (Liquid Crystal Display), for displaying information to a user.

Figure 34:
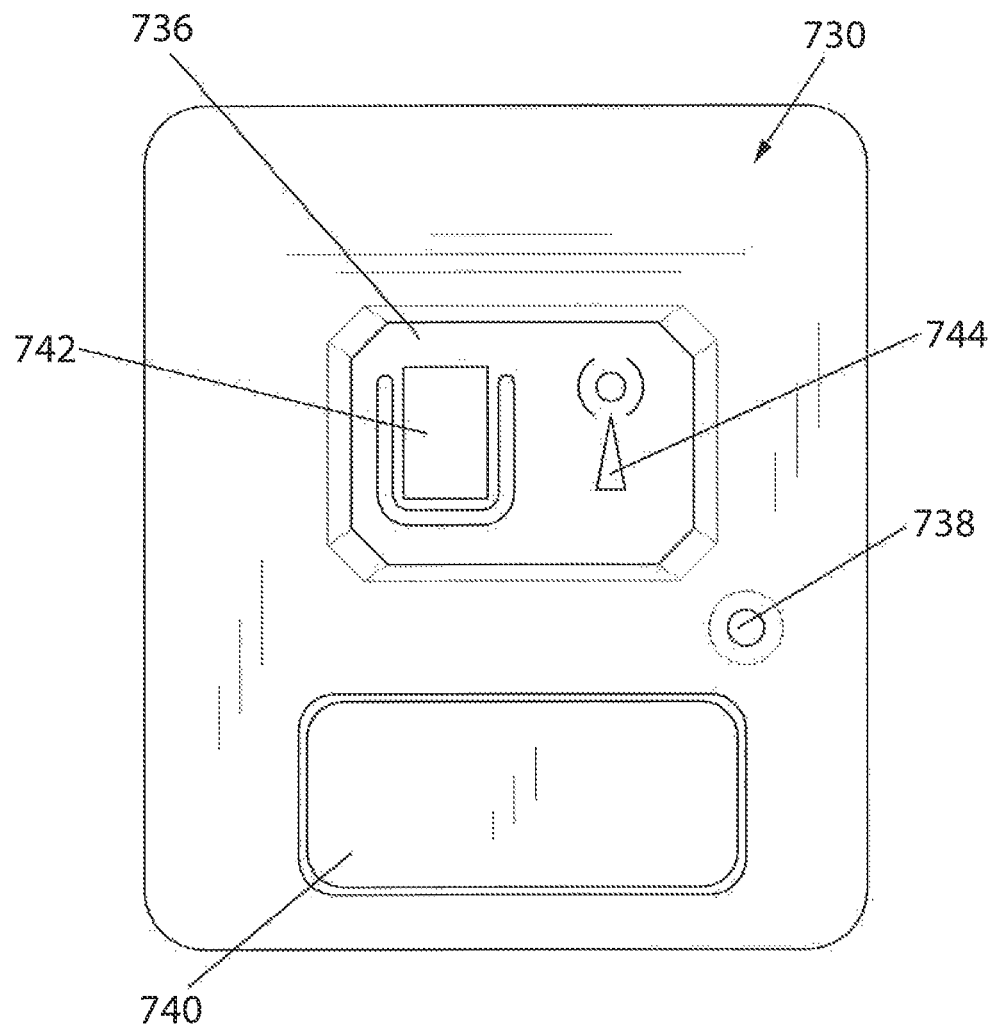
FIG. 34 is an isometric view of an alarm device utilized with a monitoring device in the system of FIG. 31.

With additional reference to FIG. 34, upon receiving the message, the processor 734 can activate a light 738 in a front area of the alarm device 730, which light could preferably be an LED (Light Emitting Diode) to indicate the low salt level condition. In addition, or alternatively, the processor 734 could send a message to the display 736 in the front area which could state, for example, "low salt". The front area could also include a label 740 for indicating details with respect to the alarm device 730, including a model and/or revision number, network access information, passwords, and the like. In one aspect, the label 716 of the monitoring device 702 could include a first set of information, and the label 740 of the alarm device 730 could include a second set of information, each of which may be required to wirelessly connect the alarm device 730 to the monitoring device 702.

The processor 734 of the alarm device 730 can also send a battery indicator 742 and/or a signal strength indicator 744 to the display 736. The battery indicator 742 could reflect a current charge level of the monitoring device 702, as periodically communicated from the monitoring device 702 to the alarm device 730 in the path A. In addition, or alternatively, the battery indicator 742 could reflect a current charge level of the alarm device 730 itself. Batteries for the monitoring device 702 and/or the alarm device 730 may preferably have a life of at least 5 years. The signal strength indicator 744 could reflect wireless communication signal strength between the monitoring device 702 and the alarm device 730 in the path A. In one aspect, the monitoring device 702 could send packets of information from the communications device 710 (Tx) of the monitoring device 702 to the communications device 732 (Rx) of the alarm device 730 during a set period of time while in a calibration stage. Every time the Tx sends a signal (2.2 s), the Rx can acknowledge the signal by leaving an icon for the signal strength indicator 744 on. This can be used for users to move the alarm device 730 around at a distance away from monitoring device 702 to find a location for the alarm device 730 that has good reception. If the alarm device 730 is moved too far away, the Rx might not receive the signal, and the icon for the signal strength indicator 744 may turn off. Moreover, as the alarm device 730 is moved farther and farther away, the icon may be off more often than it is on. Ideally, the alarm device 730 should be positioned such that the icon is on more than 70% of the time. The alarm device 730 could monitor for the message arriving at a predetermined frequency, such as a signal at about 315 MHz.

It should be appreciated that various other statuses and conditions can also be transmitted to the alarm device 730 and provided to the display 736. The scope of such statuses and conditions which may be displayed may be limited only to the size and design of the display 736 and/or processing by the processor 734.

In another aspect, labelled path "B", the aforementioned message indicating the alert can be wirelessly transmitted from the monitoring device 702 to a network 750. The network 750 could be part of a Local Area Network (LAN) using an IEE 802.11 communications protocol or Wi-Fi, for example. The network 750 could be configured to look for a predetermined signal on a channel from the monitoring device 702, thereby operating as a "sniffer". A computer 752 could connect to the network 750 to receive the message. At the computer 752, the message, in turn, could trigger additional software to generate an instant message (IM), an electronic mail (email) message, an SMS (Short Message Service) text message, an alert to a screen, and/or other steps for alerting the user. As a result, the aforementioned message indicating the alert can be received to cause a chain of events in an "If This Then That" (IFTTT) system. In addition, or alternatively, a gateway 754 or router could connect to the network 750 to receive and route the message to subscribing devices 755 through a Wide Area Network (WAN) 756, which could be the Internet and which could use a cellular communications protocol. Accordingly, such subscribing devices 755 could be portable electronic devices, such as smart phones, tablet computers, laptops, and the like having application software that is preconfigured to receive push-notifications from the monitoring device 702. Accordingly, the message, in turn, could also trigger additional software in the subscribing devices 755 to dynamically display such push-notifications and/or generate an instant message (IM), an electronic mail (email) message, an SMS (Short Message Service) text message, an alert to a screen, and/or other mechanism for alerting the user.

In yet another aspect, the aforementioned message indicating the alert can be first wirelessly transmitted from the monitoring device 702 to the alarm device 730 in path A, but then wirelessly transmitted from the alarm device 730 to the network 750, in a path "C". In this arrangement, the enhanced notifications of the computer 752 and/or subscribing devices 755 can be utilized, with the alarm device 730 functioning as a bridge. This may advantageously allow an extension of range between the monitoring device 702 and the network 750, and/or a translation of communications protocols between the monitoring device 702 and the network 750. This can also allow reduced battery consumption by the monitoring device 702, thereby extending the life of the monitoring device 702, by enabling the monitoring device 702 to communicate with the alarm device 730 using a communications protocol that is a more power efficient than the communications protocol used between the alarm device 730 to the network 750.

In yet another aspect, the aforementioned message indicating the alert can be first wirelessly transmitted from the monitoring device 702 to the network 750 in path B, but then wirelessly transmitted from the network 750 to the alarm device 730, in path C. In this arrangement, the enhanced notifications of the computer 752 and/or subscribing devices 755 can be utilized, with the alarm device 730 functioning as an additional subscribing device. This can be implemented as an additional step by the computer 752 for alerting the user. This may advantageously allow a dedicated, portable alert system to be conveniently located by the user.

In addition, the subscribing device 755 could include a location sensor. Upon receiving the message indicating the alert, the subscribing device 755 could display an alert 758 when the location sensor determines the subscribing device 755 to be in predetermined areas, such as stores which sell replacement salt. Moreover, the application software of the subscribing device 755 could be configured to provide a predictive notification system 780. The predictive notification system 780 can collect a history of alerts and predict a timeframe for a subsequent alert. This may allow anticipating when a salt reservoir is about to drop below a desired refill level. Also, a time of day and week can be incorporated in the predictive notification system 780 to take advantage of a user preference for personal shopping or contacting a salt vendor during normal business hours.

Figure 35:
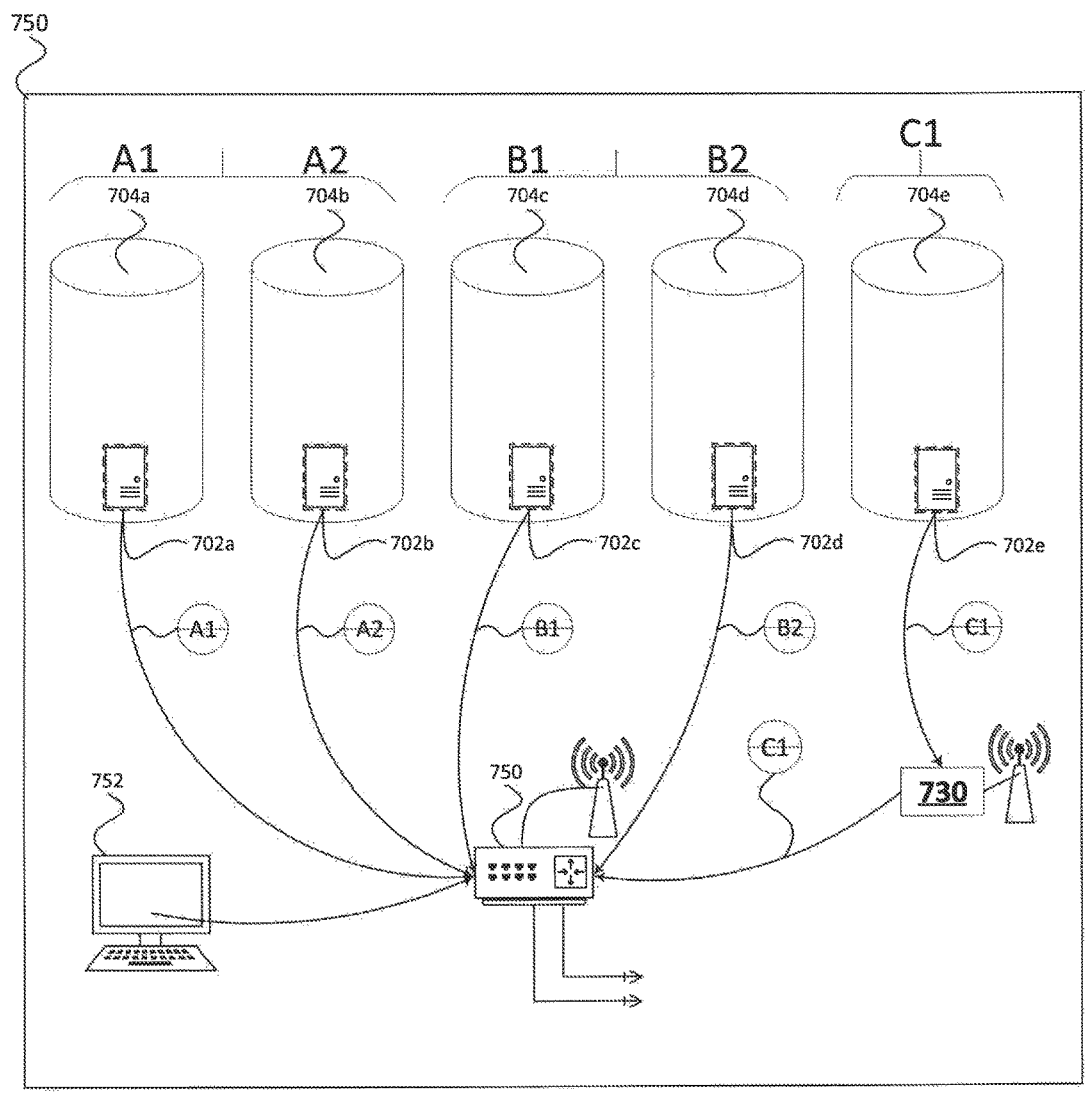
FIG. 35 is a simplified diagram of an exemplar salt level monitoring system in accordance with an aspect of the invention.

With additional reference to FIG. 35, a simplified diagram of an exemplar salt level monitoring system 750 is provided in accordance with an aspect of the invention. In the system 750, multiple monitoring devices 702, such as monitoring devices 702*a*, 702*b*, 702*c*, 702*d* and 702*e*, are individually attached to multiple water softener tanks 704, such as water softener tanks 704*a*, 704*b*, 704*c*, 704*d* and 704*e*, respectively. The water softener tanks 704*a* and 704*b* could belong to a first customer "A," the water softener tanks 704*c* and 704*d* could belong to a second customer "B," and the water softener tank 704*e* could belong to a third customer "C." Accordingly, each monitoring device 702 could be preconfigured with an identifier for distinguishing one water softener tank 704 from another, such as the monitoring device 702*a* being preconfigured with an identifier "A1" for indicating customer A's first water softener tank 704*a*, an identifier "A2" for indicating customer A's second water softener tank 704*b*, an identifier "B" for indicating customer B's first water softener tank 704*c*, and so forth. The monitoring devices 702 can operate to monitor the respective water softener tanks 704, and when a monitored condition occurs, such as a salt level falling below a predetermined threshold, the monitoring devices 702 can communicate messages 752 indicating alerts, with respective identifiers, as described above with respect to FIG. 31. For example, when salt levels are detected below the predetermined threshold by the monitoring devices 702*a* and 702*b*, these monitoring devices could communicate this condition in separate messages 752 with the distinguishing identifiers "A1" and "A2," respectively, such as to the network 750. The configuration may allow for increased reliability by bypassing alarm devices 730 which could be susceptible to a communications loss. Also, when salt levels are detected below the predetermined threshold by the monitoring devices 702*c* and 702*d*, these monitoring devices could also communicate this condition in separate messages 752 with the distinguishing identifiers "A1" and "A2," respectively, such as to the network 750. When a salt level is detected below the predetermined threshold by the monitoring device 702*e*, this monitoring device could communicate this condition in separate message 752 with the distinguishing identifiers "C1," such as a first message to the alarm device 730 and, in turn, a second message to the network 750. The configuration may allow for range extension, protocol translation and/or power savings for the monitoring device 702*e*. As a result, multiple water softener tanks 704 corresponding to differing customers, such as for an apartment complex, can be efficiently monitored and serviced under varying conditions by a single provider.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

What is claimed is:

1. A salt level monitoring system for a water softener tank, the system comprising:
    a salt level sensor configured to sense a salt level in a water softener tank, generate a signal when the salt level falls below a predetermined threshold and wirelessly send a first message indicating an alert following the signal;
    a wireless communications device in communication with the salt level sensor, the wireless communications device being remote from the salt level sensor, wherein the wireless communications device is configured to wirelessly receive the first message indicating the alert and wirelessly transmit a second message indicating the alert to a network,
    wherein the network is operable to send a third message indicating the alert to a subscribing device upon wirelessly receiving the second message,
    wherein the wireless communications device operates as bridge between the salt level sensor and the network; and
    wherein the salt level sensor communicates with the wireless communications device using a communications protocol that is a more power efficient than a communications protocol used between the wireless communications device and the network.

2. The system of claim 1, wherein the wireless communications device is configured to wirelessly communicate the second message to the network using at least one of the following:
    an IEE 802.11 communications protocol;
    an IEEE 802.15 communications protocol; and
    a cellular communications protocol.

3. The system of claim 1, wherein the subscribing device is a mobile communications device configured to wirelessly receive the third message and display the alert to a screen.

4. The system of claim 3, wherein the mobile communications device includes a location sensor, wherein the mobile communications device is further configured to display the alert when the location sensor indicates a current location in a predetermined area.

5. The system of claim 3, wherein the mobile communications device includes a predictive notification system, wherein the predictive notification system collects a history of alerts and predicts a timeframe for a subsequent alert.

6. The system of claim 3, wherein the mobile communications device is further configured to display an icon indicating a relative strength for receiving the message from the wireless communications device.

7. The system of claim 6, wherein the mobile communications device refreshes display of the icon according to calibration messages received from the wireless communications device.

8. The salt level monitor of claim 1, wherein the salt level sensor is configured to detect a dirty tank condition comprising salt buildup on a wall of the tank, and wherein the wireless communications device is configured to indicate the dirty tank condition in the message.

9. The salt level monitor of claim 1, wherein the wireless communications device is further configured to indicate a charge level of the salt level sensor.

10. A salt level monitoring system for a water softener tank, the system comprising:
    a monitoring device configured to sense a salt level in a water softener tank arranged in a first location, the monitoring device being configured to wirelessly generate a first signal at a frequency when the salt level falls below a predetermined threshold in the water softener tank, wherein the first signal includes a preconfigured identifier for distinguishing one monitoring device from another;
    an alarm device arranged in a second location distal to the first location, the alarm device being in wireless communication with the monitoring, device, wherein the alarm device is configured to wirelessly transmit a second signal upon wirelessly receiving the first signal from the monitoring device at the frequency, wherein the second signal includes the preconfigured identifier; and
    a wireless base station arranged in a third location distal to the first and second locations, the wireless base station being connected to a network, wherein the wireless base station is configured to wirelessly detect the second signal from the alarm device and communicate a message indicating an alert corresponding to the salt level sensor having the preconfigured identifier to the network upon detecting the second signal, wherein the wireless base station is operable to send the message indicating the alert to a subscribing device upon wirelessly receiving the second signal, wherein the alarm device operates as a wireless bridge between the monitoring device and the wireless base station; and wherein the monitoring device communicates with the alarm device using a communications protocol at the frequency that is more power efficient than a communications protocol used between the alarm device and the wireless base station.

11. The system of claim 10, wherein the alarm device is configured to wirelessly detect the first signal at the frequency of about 315 MHz and wirelessly transmit the second signal to the wireless base station over a Local Area Network (LAN).

12. The system of claim 10, wherein the alarm device comprises a display, wherein the alarm device is configured to display the alert to the display.

13. The system of claim 10, wherein the wireless base station comprises a gateway configured to communicate over the Internet.

14. A salt level monitor system for a water softener tank, comprising:
   a salt level sensor configured to sense a salt level in a water softener tank, generate a signal when the salt level falls below a predetermined threshold in the water softener tank, and wirelessly send a first message indicating an alert following the signal; and
   an alarm system arranged remote from the salt level sensor, the alarm system being in wireless communication with the salt level sensor, the alarm system being configured to wirelessly receive the first message indicating the alert and wirelessly transmit a second message indicating the alert to a network,
   wherein the network is operable to send a third message indicating the alert to a device, network or automation system to provide information to a user upon wirelessly receiving the second message,
   wherein the alarm system operates as bridge between the salt level sensor and the network; and
   wherein the salt level sensor communicates with the alarm system using a communications protocol that is a more power efficient than a communications protocol used between the alarm system and the network.

15. The salt level monitor system of claim 14, wherein the alarm system comprises each of the following:
   a) a sniffer/gateway that is connected to a home hub point-to-point network;
   b) a separate circuit board and housing that monitors communication sent by a transmitter at about 315 MHz intended for a display unit and interfaces to a local internet hub to communicate salt level status;
   c) hardware connected to a transmitter that provides wireless hub support; and
   d) a transmitter board including components to send messages to a local internet or WIFI hub to share salt status.

16. The salt level monitor system of claim 14 wherein when the salt level changes from full to below a threshold, an alert is sent to a user informing the user of the condition via connectivity to at least one of a gateway, WIFI, and an SMS Text message.

17. The salt level monitor system of claim 14 further comprising:
   a predictive notification system to a low salt condition,
   wherein a history is collected and a predictive algorithm is used to anticipate when a salt reservoir is about to drop below a desired refill level.

18. The salt level monitor system of claim 14, wherein the system is a home automation solution and protocol comprising at least one of the following:
   a) a Bluetooth or Bluetooth Mesh protocol for many-to-many over low energy close proximity Bluetooth radio to allow devices to re-transmit messages from nearby peers and extend the range of the overall device network;
   b) a webmesh wireless network allowing each node to repeat data transfer to extend range;
   c) a Z-Wave wireless smart home control technology which operates at about 908 MHz:
   d) a universal power bus that uses building power wiring to transmit signals to control remote devices;
   e) a Google thread that uses 6LoWPAN (IEEE802.15) wireless protocol with mesh communication;
   f) an Insteon protocol that uses power wiring and radio frequency to control remote devices; and
   h) a Zigbee small low-power digital radio for close proximity low data rate communication.

19. The salt level monitor system of claim 14 further comprising:
   an alert signaler located in a frequented area of a house so it will be noticed when it alarms; and
   software and hardware to wirelessly communicate to a wireless network or a device on a wireless network, wherein the wireless communication includes transmitting alerts, slat status, and other conditions through an internet and to an application on a mobile device, tablet, or computer using a messaging protocol.

20. The salt level monitor system of claim 14 wherein the alarm system comprises:
   a) an LCD unit or other unit which acts as a signal strength meter and sends out packets of information from a transmitter to a remote receiver during a set period of time while in a calibration stage, wherein the unit is used by a user to move around at a distance away from the transmitter to find a location for the remote receiver that has good reception and if the user moves too far away, there will be times the receiver does not receive a packet and the icon will turn off; and
   b) receiver electronics in communication with a valve board of a softener that lets the softener valve board receive commands from a transmitter, decode them, and handle the 'low-salt' condition through a display, WIFI connection, or other alarm; and
   wherein the alarm system can be placed up to 100 feet away from the tank and is battery operated with at least 5 years of life.

* * * * *